United States Patent
Jayaraman et al.

(10) Patent No.: US 10,606,955 B2
(45) Date of Patent: Mar. 31, 2020

(54) INCIDENT MATCHING WITH VECTOR-BASED NATURAL LANGUAGE PROCESSING

(71) Applicant: ServiceNow, Inc., Santa Clara, CA (US)

(72) Inventors: Baskar Jayaraman, Fremont, CA (US); Aniruddha Madhusudan Thakur, Saratoga, CA (US); ChitraBharathi Ganapathy, San Jose, CA (US); Shiva Shankar Ramanna, Fremont, CA (US)

(73) Assignee: ServiceNow, Inc., Santa Clara, CA (US)

( * ) Notice: Subject to any disclaimer, the term of this patent is extended or adjusted under 35 U.S.C. 154(b) by 188 days.

(21) Appl. No.: 15/922,228

(22) Filed: Mar. 15, 2018

(65) Prior Publication Data
US 2019/0286700 A1    Sep. 19, 2019

(51) Int. Cl.
*G10L 15/22* (2006.01)
*G06F 17/00* (2019.01)
*G06F 17/27* (2006.01)
*G06N 3/08* (2006.01)
*G06F 16/33* (2019.01)

(52) U.S. Cl.
CPC ........ *G06F 17/2785* (2013.01); *G06F 16/334* (2019.01); *G06N 3/08* (2013.01)

(58) Field of Classification Search
CPC ................................ G10L 15/22; G06F 17/00
See application file for complete search history.

(56) References Cited

U.S. PATENT DOCUMENTS

| 7,831,597 B2 * | 11/2010 | Wu ....................... G06F 16/345 707/736 |
| 9,984,062 B1 * | 5/2018 | Strope ................. G06F 17/2775 |
| 10,366,327 B2 * | 7/2019 | Le .......................... G06F 17/277 |
| 2004/0034656 A1 * | 2/2004 | Beesley .............. G06F 17/2755 |

(Continued)

OTHER PUBLICATIONS

Qingyao Ai, Liu Yang, Jiafeng Guo, W. Bruce Croft, Analysis of the Paragraph Vector Model for Information Retrieval, Proceedings of the 2016 ACM International Conference on the Theory of Information Retrieval, Sep. 12, 2016.

(Continued)

*Primary Examiner* — Shreyans A Patel
(74) *Attorney, Agent, or Firm* — Fletcher Yoder PC

(57) ABSTRACT

A database may contain a corpus of text strings, the text strings respectively associated with vector representations thereof, where each of the vector representations is an aggregation of vector representations of words in the associated text string. An artificial neural network (ANN) may have been trained with mappings between: (i) the words in the text strings, and (ii) for each respective word, one or more sub strings of the text strings in which the word appears. A server device may be configured to: receive an input text string; generate an input aggregate vector representation of the input text string by applying an encoder of the ANN to words in the input text string; compare the input aggregate vector representation to the vector representations; identify a relevant subset of the vector representations; and transmit the text strings that are associated with the relevant subset of the vector representations.

20 Claims, 20 Drawing Sheets

(56) References Cited

U.S. PATENT DOCUMENTS

2009/0171956 A1\* 7/2009 Gupta ................. G06F 16/35
2018/0018971 A1\* 1/2018 Park .................. G06F 16/243

OTHER PUBLICATIONS

Quoc Le, Tomas Mikolov, Distributed Representations of Sentences and Documents, Proceedings of the 31st International Conference on Machine Learning, Beijing, China, 2014.
Vector Representations of Words, https://www.tensorflow.org/tutorials/word2vec (downloaded from public Internet site Jan. 21, 2018).

\* cited by examiner

800

| ORIGINATOR | BOB SMITH | ← 802 |
|---|---|---|
| CREATED | 2018-02-07 9:56AM | ← 804 |
| PROBLEM DESCRIPTION | MY EMAIL CLIENT IS NOT DOWNLOADING NEW EMAILS. I AM CONNECTED TO THE WIRELESS NETWORK AND CAN ACCESS THE INTERNET, BUT MY CLIENT KEEPS REPORTING THAT IT IS UNABLE TO ACCESS THE SERVER. | ← 806 |
| CATEGORY | EMAIL | ← 808 |
| ASSIGNED TO | ALICE JONES | ← 810 |
| STATUS | RESOLVED | ← 812 |
| RESOLUTION | BOB'S LAPTOP WAS CONNECTED TO THE "GUEST" WIRELESS NETWORK, WHICH IS OUTSIDE OF THE FIREWALL. I TOLD HIM THAT HE COULD EITHER USE THE VPN TO ACCESS HIS EMAIL, OR CONNECT TO THE "EMPLOYEE" WIRELESS NETWORK, WHICH REQUIRES THE PASSWORD BUT IS INSIDE THE FIREWALL. | ← 814 |
| RESOLVED TIME | 2018-02-07 10:10AM | ← 816 |
| CLOSURE CODE | SOLVED (PERMANENTLY) | ← 818 |
| NOTES | THIS IS THE THIRD TIME IN A WEEK THAT I'VE HAD TO ADDRESS A SIMILAR ISSUE. CAN WE POST WIRELESS NETWORKING INSTRUCTIONS IN ALL CONFERENCE ROOMS? | ← 820 |
| LINK TO KNOWLEDGE BASE | ITKB/WIRELESS/CONFIGURATION.HTML | ← 822 |

FIG. 8

| SIMILARITY STATISTIC | 80-100 | 60-80 | 40-60 | 20-40 | 0-20 |
|---|---|---|---|---|---|
| LINK TO KNOWLEDGE BASE MATCH | MEDIUM | LOW | LOW | LOW | LOW |
| CATEGORY MATCH | HIGH | MEDIUM | LOW | LOW | LOW |
| TEXT MATCH | HIGH | MEDIUM | LOW | LOW | LOW |

1210

FIG. 12B

INCIDENT MATCHING WITH VECTOR-BASED NATURAL LANGUAGE PROCESSING

BACKGROUND

In medium to large enterprises, one of the critical tasks of an information technology (IT) department is to rapidly resolve technical issues experienced by users. These issues may be referred to as "incidents," and may vary in scope from a single user being confused about how to utilize a specific software application, to a network-wide service outage impacting most or all users. Many IT departments have a semi-automated incident reporting mechanism that receives text input from a user (e.g., by way of a web page or email) that describes the problem in the user's words. An IT representative then reviews this description and uses his or her own subjective experience and judgment to determine the criticality of the incident and a potential solution. In some cases, the IT representative may perform keyword-based queries of a database in an attempt to identify similar incidents that have occurred in the past. Nonetheless, this ad-hoc approach often leads to misclassification of incidents, as well as inconsistent and slow responses thereto, as the queries lack context.

SUMMARY

The embodiments herein overcome the aforementioned limitations by introducing mechanisms for matching a current IT incident description to past descriptions using vector-based natural language processing. This allows IT incidents to be classified and handled in a rapid and objective fashion, making use of the IT department's collective knowledge and experience. Nonetheless, these embodiments are not limited to the processing of IT incidents, and may be used for any purpose that involves contextually matching an input text string to one or more text strings in a database. Note that the term "match" as used herein does not imply that exact string matches are found. The matching technique in these embodiments is better described as using "fuzzy matching," in which matches can be less than 100% perfect but still relevant.

A first example embodiment may involve a database containing a corpus of text strings, the text strings respectively associated with pre-calculated vector representations of the text strings, where each of the pre-calculated vector representations is an aggregation of vector representations of words in the associated text string. The first example embodiment may also include an artificial neural network (ANN) including an encoder and a decoder, where the ANN has been trained with mappings between: (i) the words in the text strings, and (ii) for each respective word, one or more substrings of the text strings in which the word appears, where the encoder generates, from the respective words, vector representations of the respective words. The first example embodiment may also involve a server device configured to: receive, from a client device, an input text string; generate an input aggregate vector representation of the input text string by applying the encoder to the words in the input text string; compare the input aggregate vector representation to the pre-calculated vector representations; based on the comparison, identify a relevant subset of the pre-calculated vector representations; and transmit, to the client device, the text strings from the corpus of text strings that are associated with the relevant subset of the pre-calculated vector representations.

A second example embodiment may involve receiving, from a client device, an input text string, where a database contains a corpus of text strings, the text strings respectively associated with pre-calculated vector representations of the text strings, where each of the pre-calculated vector representations is an aggregation of vector representations of words in the associated text string, where an ANN includes an encoder and a decoder, and where the ANN was trained with mappings between: (i) the words in the text strings, and (ii) for each respective word, one or more substrings of the text strings in which the word appears. The second example embodiment may also involve generating an input aggregate vector representation of the input text string by applying the encoder to the words in the input text string. The second example embodiment may also involve comparing the input aggregate vector representation to the pre-calculated vector representations. The second example embodiment may also involve, possibly based on the comparison, identifying a relevant subset of the pre-calculated vector representations. The second example embodiment may also involve transmitting, to the client device, the text strings from the corpus of text strings that are associated with the relevant subset of the pre-calculated vector representations.

In a third example embodiment, an article of manufacture may include a non-transitory computer-readable medium, having stored thereon program instructions that, upon execution by a computing system, cause the computing system to perform operations in accordance with the first and/or second example embodiments.

In a fourth example embodiment, a computing system may include at least one processor, as well as memory and program instructions. The program instructions may be stored in the memory, and upon execution by the at least one processor, cause the computing system to perform operations in accordance with the first and/or second example embodiments.

In a fifth example embodiment, a system may include various means for carrying out each of the operations of the first and/or second example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 depicts an incident report, in accordance with example embodiments.

FIG. 12B depicts a graphical user interface, in accordance with example embodiments.

DETAILED DESCRIPTION

Figure 1:
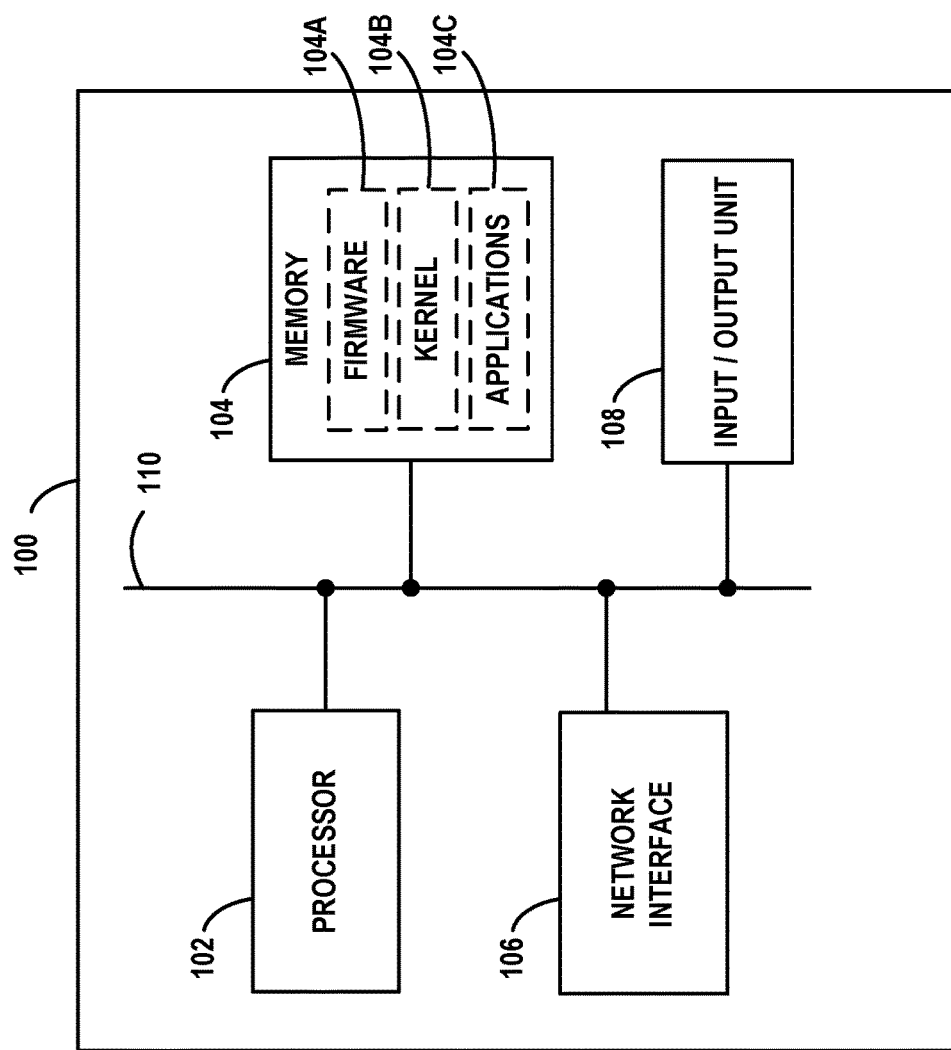
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
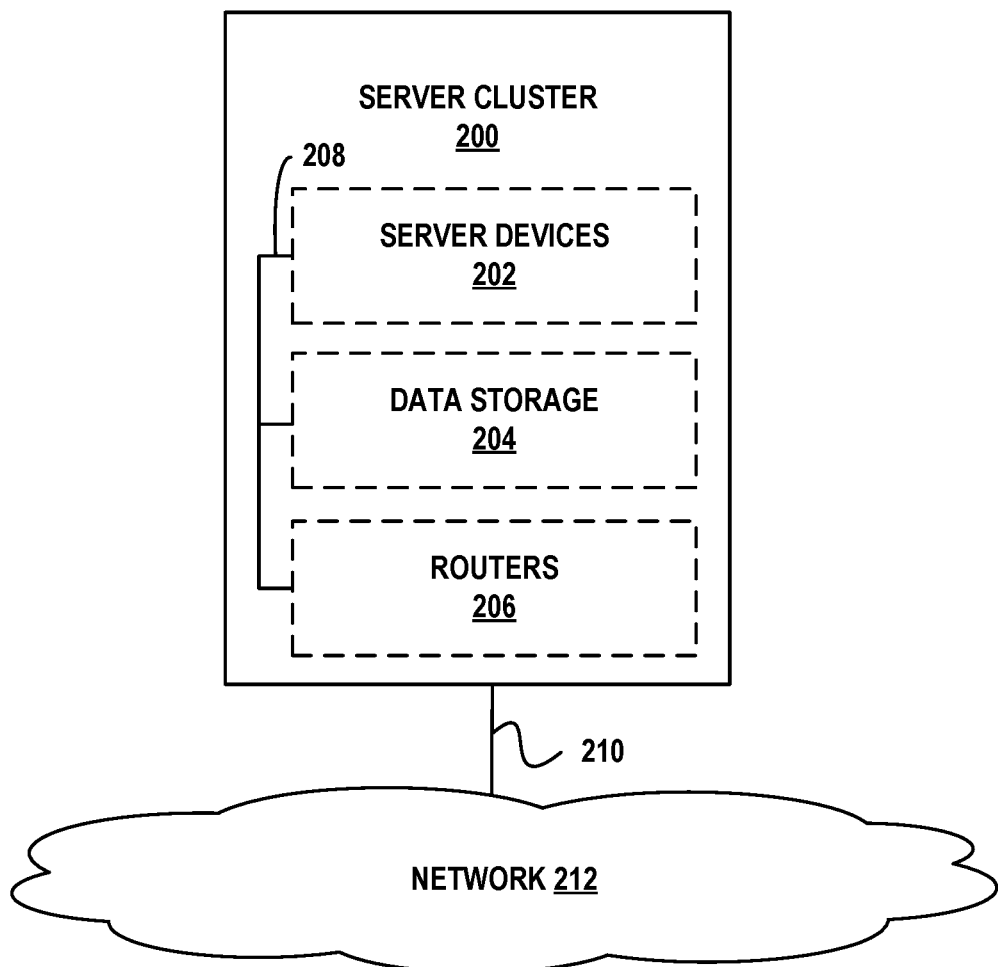
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
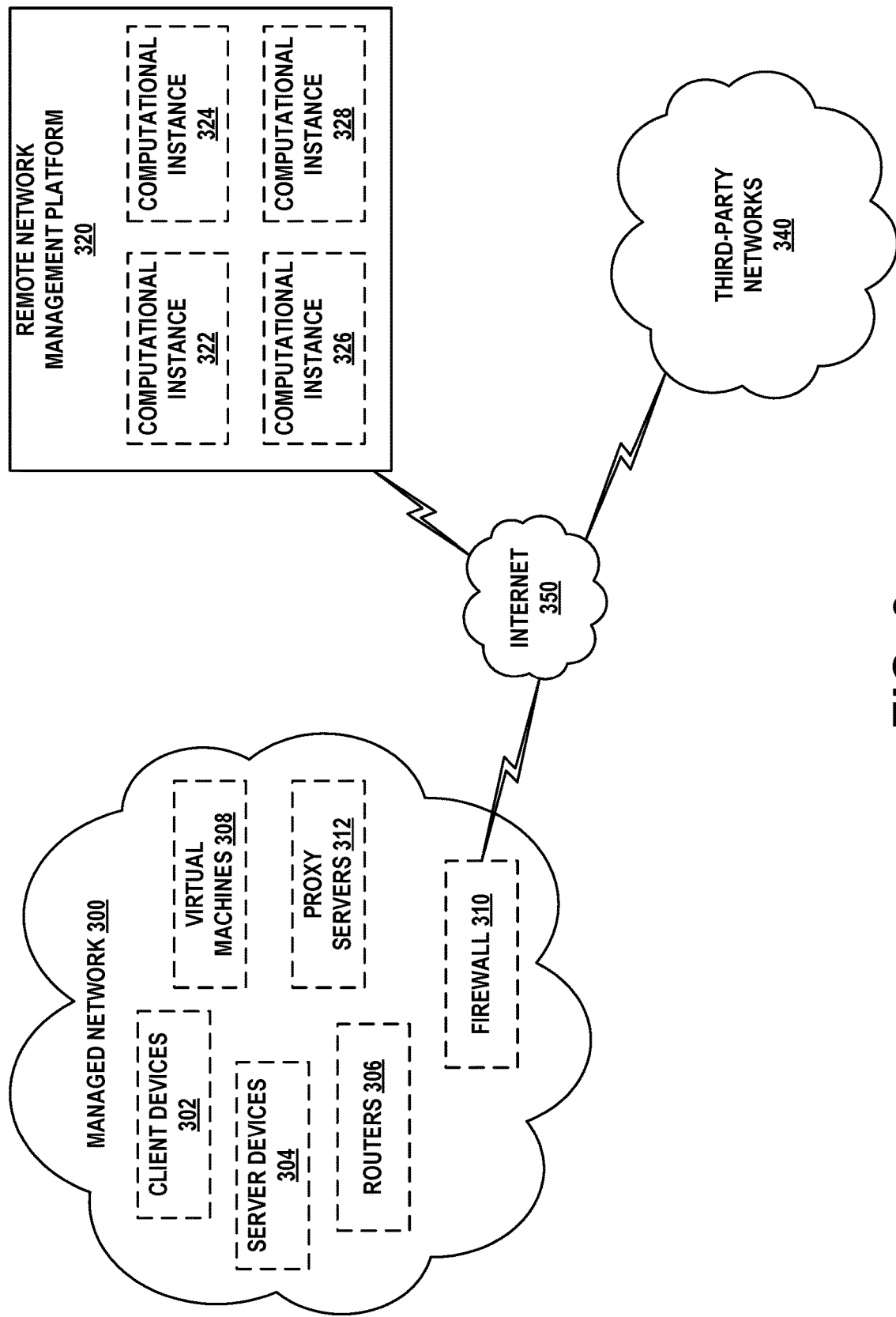
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
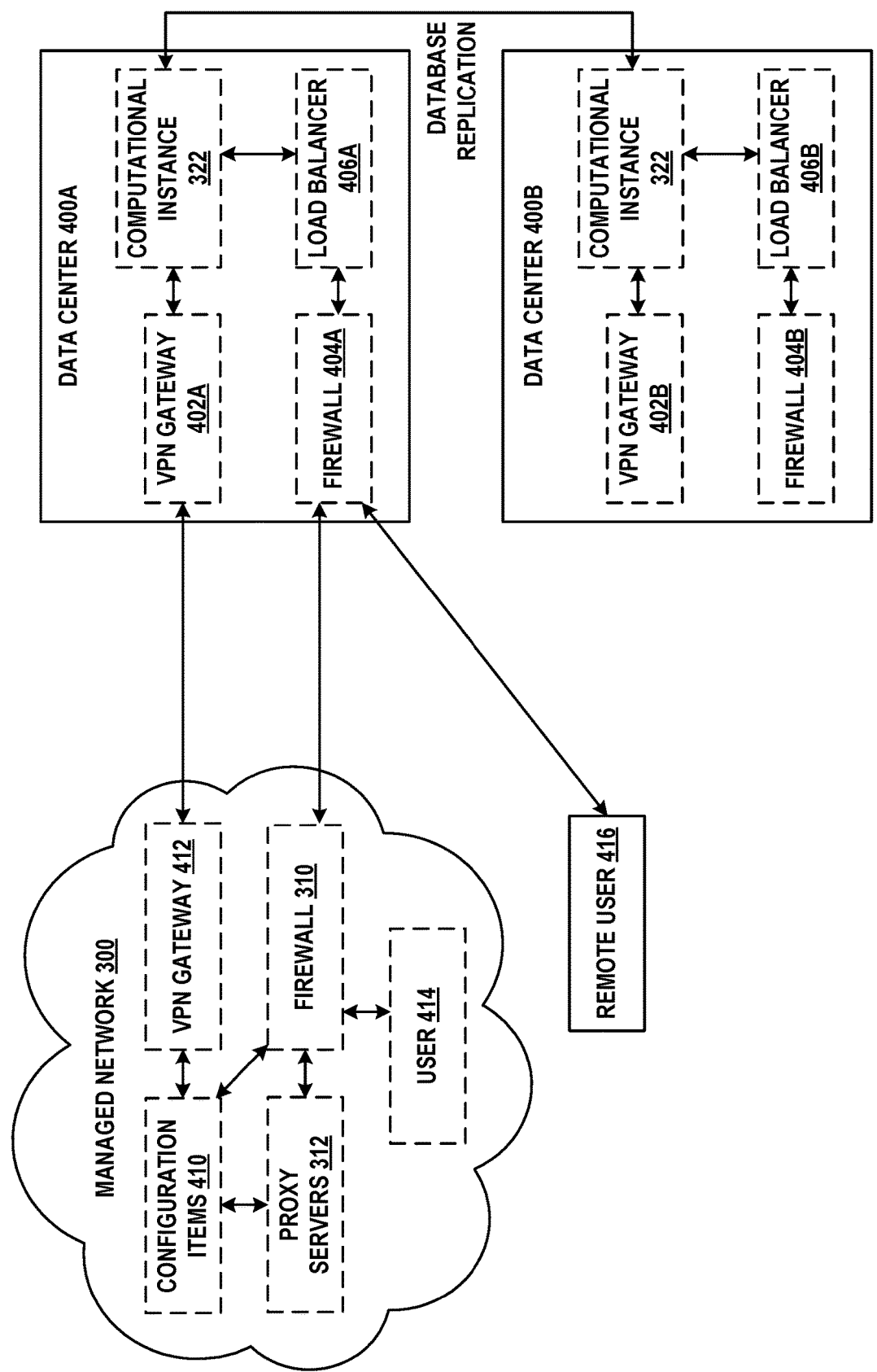
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
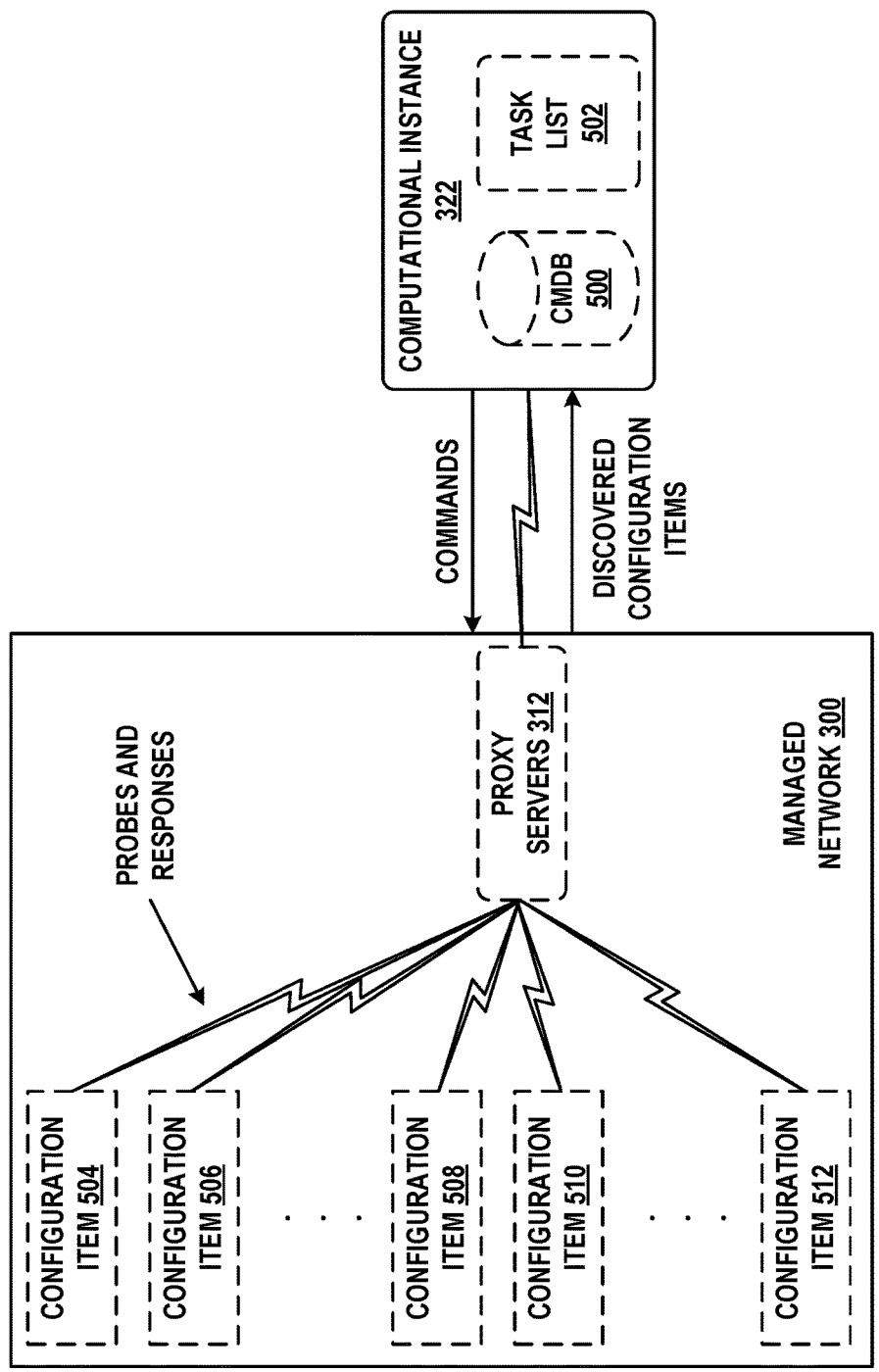
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
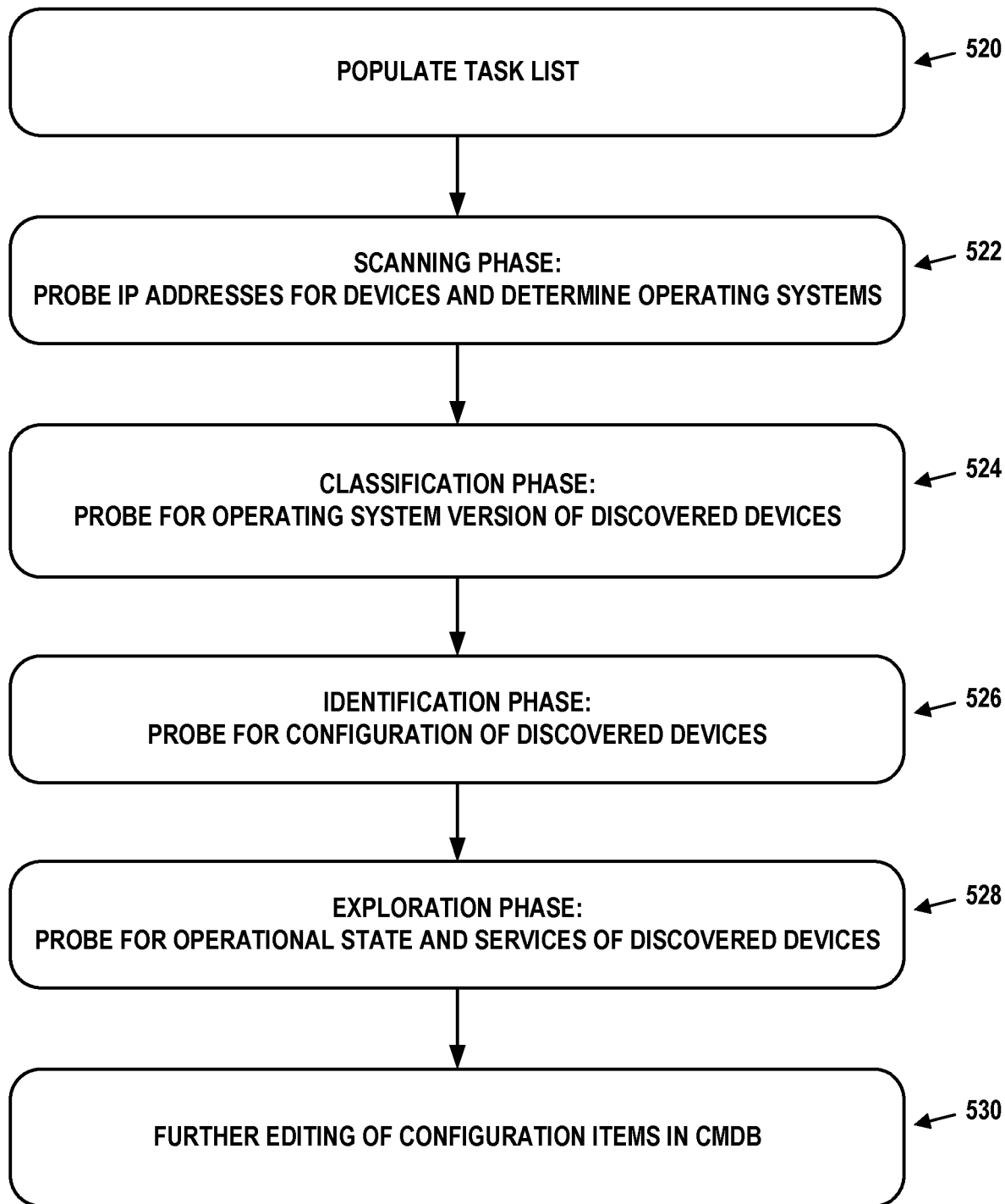
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. ARTIFICIAL NEURAL NETWORKS

In order to fully appreciate the embodiments herein, a basic background in machine learning, particularly ANNs, may be useful. An ANN is a computational model in which a number of simple units, working individually in parallel and without central control, combine to solve complex problems. While this model may resemble an animal's brain in some respects, analogies between ANNs and brains are tenuous at best. Modern ANNs have a fixed structure, use a deterministic mathematical learning process, are trained to solve one problem at a time, and are much smaller than their biological counterparts.

A. Example ANN

Figure 6:
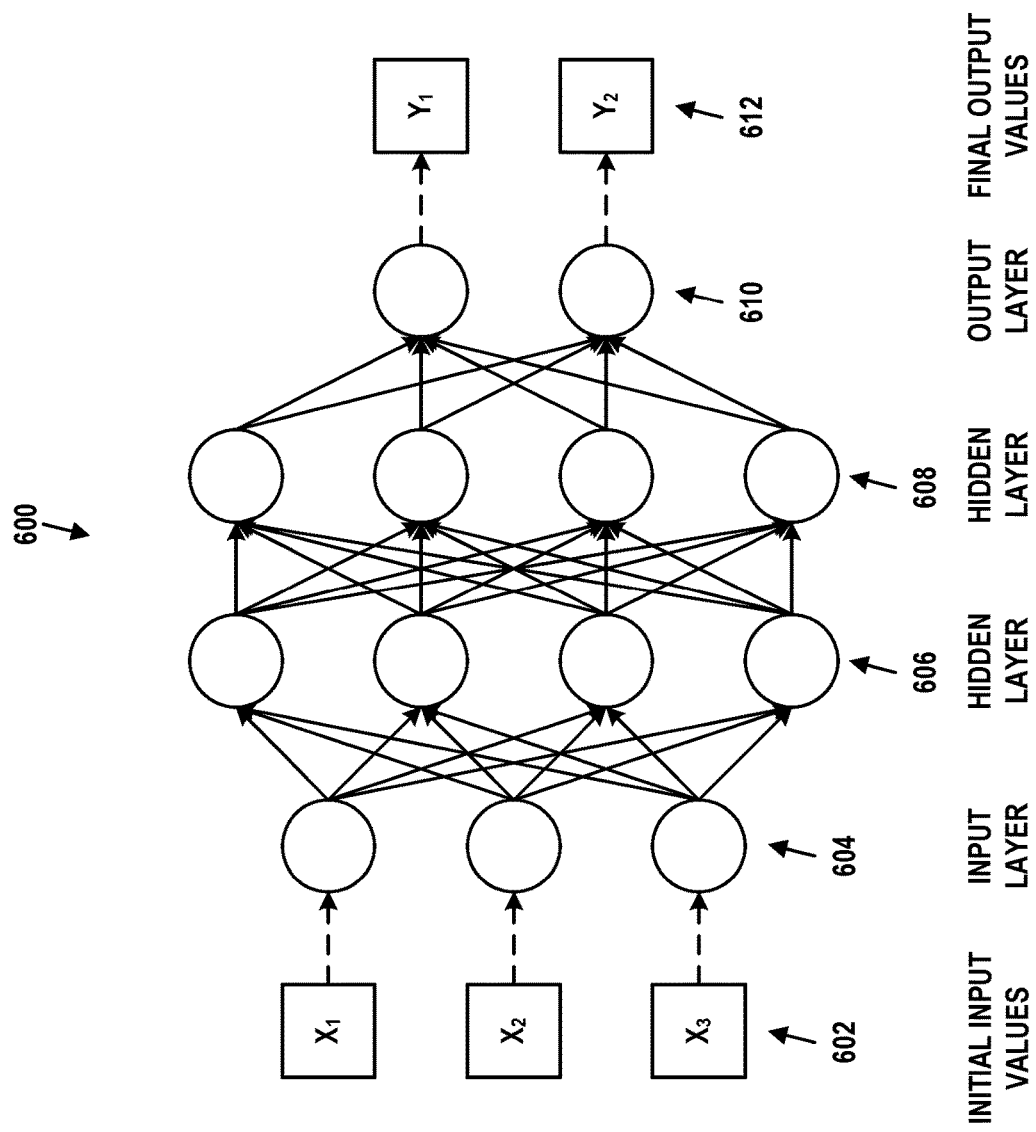
FIG. 6 depicts an ANN, in accordance with example embodiments.

An ANN is represented as a number of nodes that are arranged into a number of layers, with connections between the nodes of adjacent layers. An example ANN 600 is shown in FIG. 6. ANN 600 represents a feed-forward multilayer neural network, but similar structures and principles are used in convolutional neural networks, recurrent neural networks, and recursive neural networks, for example.

Regardless, ANN 600 consists of four layers: input layer 604, hidden layer 606, hidden layer 608, and output layer 610. The three nodes of input layer 604 respectively receive $X_1$, $X_2$, and $X_3$ from initial input values 602. The two nodes of output layer 610 respectively produce $Y_1$ and $Y_2$ for final output values 612. ANN 600 is a fully-connected network, in that nodes of each layer aside from input layer 604 receive input from all nodes in the previous layer.

The solid arrows between pairs of nodes represent connections through which intermediate values flow, and are each associated with a respective weight (e.g., any real number) that is applied to the respective intermediate value. Each node performs an operation on its input values and their associated weights to produce an output value. In some cases this operation may involve a dot-product sum of the products of each input value and associated weight. An activation function may be applied to the result of the dot-product sum to produce the output value. Other operations are possible.

For example, if a node receives input values $\{x_1, x_2, \ldots, x_n\}$ on n connections with respective weights of $\{w_1, w_2, \ldots, w_n\}$, the dot-product sum d may be determined as:

$$d = \sum_{i=1}^{n} x_i w_i + b \quad (1)$$

Where b is a node-specific or layer-specific bias.

Notably, the fully-connected nature of ANN 600 can be used to effectively represent a partially-connected ANN by giving one or more weights a value of 0. Similarly, the bias can also be set to 0 to eliminate the b term.

An activation function, such as the logistic function, may be used to map d to an output value z that is between 0 and 1, inclusive:

$$z = \frac{1}{1+e^{-d}} \quad (2)$$

Functions other than the logistic function, such as the sigmoid or tan h functions, may be used instead.

Then, z may be used on each of the node's output connections, and will be modified by the respective weights thereof. Particularly, in ANN 600, input values and weights are applied to the nodes of each layer, from left to right until final output values 612 are produced. If ANN 600 has been fully trained, final output values 612 are a proposed solution to the problem that ANN 600 has been trained to solve. In order to obtain a meaningful, useful, and reasonably accurate solution, ANN 600 requires at least some extent of training.

B. Training

Training an ANN usually involves providing the ANN with some form of supervisory training data, namely sets of input values and desired, or ground truth, output values. For ANN 600, this training data may include m sets of input values paired with output values. More formally, the training data may be represented as:

$$\{X_{1,i}, X_{2,i}, X_{3,i}, Y_{1,i}^*, Y_{2,i}^*\} \quad (3)$$

Where $i=1 \ldots m$, and $Y_{1,i}^*$ and $Y_{2,i}^*$ are the desired output values for the input values of $X_{1,i}$, $X_{2,i}$, and $X_{3,i}$.

The training process involves applying the input values from such a set to ANN 600 and producing associated output values. A loss function is used to evaluate the error between the produced output values and the ground truth output values. This loss function may be a sum of absolute differences, mean squared error, or some other metric with positive value. In some cases, error values are determined for all of the m sets, and the error function involves calculating an aggregate (e.g., a sum or an average) of these values.

Once the error is determined, the weights on the connections are updated in an attempt to reduce the error. In simple terms, this update process should reward "good" weights and penalize "bad" weights. Thus, the updating should distribute the "blame" for the error through ANN 600 in a fashion that results in a lower error for future iterations of the training data.

The training process continues applying the training data to ANN 600 until the weights converge. Convergence occurs, for example, when the error is less than a threshold value, the change in the error is sufficiently small between consecutive iterations of training, a pre-determined maximum number of iterations is reached, or a pre-determined maximum amount of time has passed. At this point, ANN 600 is said to be "trained" and can be applied to new sets of input values in order to predict output values that are unknown.

Most training techniques for ANNs make use of some form of backpropagation. Backpropagation distributes the error one layer at a time, from right to left, through ANN 600. Thus, the weights of the connections between hidden layer 608 and output layer 610 are updated first, the weights of the connections between hidden layer 606 and hidden layer 608 are updated second, and so on. This updating is based on the derivative of the activation function.

Figure 7A:
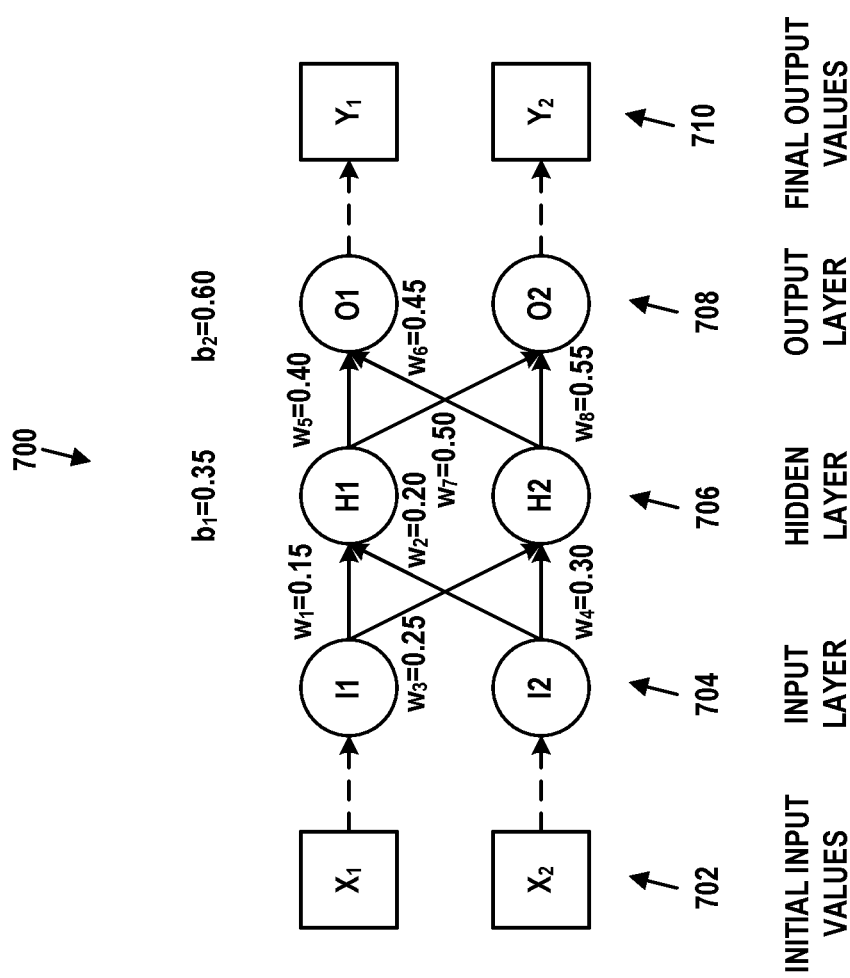
FIG. 7A depicts an ANN in the process of being trained, in accordance with example embodiments.

In order to further explain error determination and backpropagation, it is helpful to look at an example of the process in action. However, backpropagation becomes quite complex to represent except on the simplest of ANNs. Therefore, FIG. 7A introduces a very simple ANN 700 in order to provide an illustrative example of backpropagation.

ANN 700 consists of three layers, input layer 704, hidden layer 706, and output layer 708, each having two nodes. Initial input values 702 are provided to input layer 704, and output layer 708 produces final output values 710. Weights have been assigned to each of the connections. Also, bias $b_1=0.35$ is applied to the net input of each node in hidden layer 706, and a bias $b_2=0.60$ is applied to the net input of each node in output layer 708. For clarity, Table 1 maps weights to pair of nodes with connections to which these weights apply. As an example, $w_2$ is applied to the connection between nodes I2 and H1, $w_7$ is applied to the connection between nodes H1 and O2, and so on.

TABLE 1

| Weight | Nodes |
|---|---|
| $w_1$ | I1, H1 |
| $w_2$ | I2, H1 |
| $w_3$ | I1, H2 |
| $w_4$ | I2, H2 |
| $w_5$ | H1, O1 |
| $w_6$ | H2, O1 |
| $w_7$ | H1, O2 |
| $w_8$ | H2, O2 |

For purpose of demonstration, initial input values are set to $X_1=0.05$ and $X_2=0.10$, and the desired output values are set to $Y_1^*=0.01$ and $Y_2^*=0.99$. Thus, the goal of training ANN 700 is to update the weights over some number of feed forward and backpropagation iterations until the final output values 710 are sufficiently close to $Y_1^*=0.01$ and $Y_2^*=0.99$ when $X_1=0.05$ and $X_2=0.10$. Note that use of a single set of training data effectively trains ANN 700 for just that set. If multiple sets of training data are used, ANN 700 will be trained in accordance with those sets as well.

1. Example Feed Forward Pass

To initiate the feed forward pass, net inputs to each of the nodes in hidden layer 706 are calculated. From the net inputs, the outputs of these nodes can be found by applying the activation function.

For node H1, the net input $net_{H1}$ is:

$$net_{H1} = w_1 X_1 + w_2 X_2 + b_1 \qquad (4)$$
$$= (0.15)(0.05) + (0.20)(0.10) + 0.35 = 0.3775$$

Applying the activation function (here, the logistic function) to this input determines that the output of node H1, $out_{H1}$ is:

$$out_{H1} = \frac{1}{1 + e^{-net_{H1}}} \qquad (5)$$
$$= 0.593269992$$

Following the same procedure for node H2, the output $out_{H2}$ is 0.596884378. The next step in the feed forward iteration is to perform the same calculations for the nodes of output layer 708. For example, net input to node O1, $net_{O1}$ is:

$$net_{O1} = w_5 out_{H1} + w_6 out_{H2} + b_2 \qquad (6)$$
$$= (0.40)(0.593269992) + (0.45)(0.596884378) + 0.60$$
$$= 1.105905967$$

Thus, output for node O1, $out_{O1}$ is:

$$out_{O1} = \frac{1}{1 + e^{-net_{O1}}} \qquad (7)$$
$$= 0.75136507$$

Following the same procedure for node O2, the output $out_{O2}$ is 0.772928465. At this point, the total error, $\Delta$, can be determined based on a loss function. In this case, the loss function can be the sum of the squared error for the nodes in output layer 708. In other words:

$$\Delta = \Delta_{O1} + \Delta_{O2} \qquad (8)$$
$$= \frac{1}{2}(out_{O1} - \hat{Y}_1)^2 + \frac{1}{2}(out_{O2} - \hat{Y}_2)^2$$
$$= \frac{1}{2}(0.75136507 - 0.01)^2 + \frac{1}{2}(0.772928465 - 0.99)^2$$
$$= 0.274811083 + 0.023560026 = 0.298371109$$

The multiplicative constant ½ in each term is used to simplify differentiation during backpropagation. Since the overall result can be scaled by a learning rate $\alpha$ (see below), this constant does not negatively impact the training. Regardless, at this point, the feed forward iteration completes and backpropagation begins.

2. Backpropagation

As noted above, a goal of backpropagation is to use $\Delta$ to update the weights so that they contribute less error in future feed forward iterations. As an example, consider the weight $w_5$. The goal involves determining how much the change in $w_5$ affects $\Delta$. This can be expressed as the partial derivative $$\frac{\partial \Delta}{\partial w_5}.$$

Using the chain rule, this term can be expanded as:

$$\frac{\partial \Delta}{\partial w_5} = \frac{\partial \Delta}{\partial out_{O1}} \times \frac{\partial out_{O1}}{\partial net_{O1}} \times \frac{\partial net_{O1}}{\partial w_5} \qquad (9)$$

Thus, the effect on $\Delta$ of change to $w_5$ is equivalent to the product of (i) the effect on $\Delta$ of change to $out_{O1}$, (ii) the effect on $out_{O1}$ of change to $net_{O1}$, and (iii) the effect on $net_{O1}$ of change to $w_5$. Each of these multiplicative terms can be determined independently. Intuitively, this process can be thought of as isolating the impact of $w_5$ on $net_{O1}$, the impact of $net_{O1}$ on $out_{O1}$, and the impact of $out_{O1}$ on $\Delta$.

Ultimately, $$\frac{\partial \Delta}{\partial w_5}$$

can be expressed as:

$$\frac{\partial \Delta}{\partial w_5} = (out_{O1} - \hat{Y}_1) out_{O1}(1 - out_{O1}) out_{H1} \qquad (10)$$
$$= (0.74136507)(0.186815602)(0.593269992) = 0.082167041$$

Then, this value can be subtracted from $w_5$. Often a learning rate (e.g., a gain), $0 < \alpha \leq 1$, is applied to $$\frac{\partial \Delta}{\partial w_5}$$

to control how aggressively the ANN responds to errors. Assuming that $\alpha = 0.5$, the full expression is $$w_5 = w_5 - \alpha \frac{\partial \Delta}{\partial w_5}.$$

Similar equations can be derived for each of the other weights, $w_6$, $w_7$, and $w_8$ feeding into output layer 708. Each of these equations can be solved using the information above. The results are:

$w_5 = 0.35891648$ $w_6 = 0.40866619$ $w_7 = 0.51130127$ $w_8 = 0.56137012 \qquad (11)$ Next, updates to the remaining weights, $w_1$, $w_2$, $w_3$, and $w_4$ are calculated. This involves continuing the backpropagation pass to hidden layer 706. Considering $w_1$ and using a similar derivation as above:

$$\frac{\partial \Delta}{\partial w_1} = \frac{\partial \Delta}{\partial out_{H1}} \times \frac{\partial out_{H1}}{\partial net_{H1}} \times \frac{\partial net_{H1}}{\partial w_1} \quad (12)$$

One difference, however, between the backpropagation techniques for output layer 708 and hidden layer 706 is that each node in hidden layer 706 contributes to the error of all nodes in output layer 708. Therefore:

$$\frac{\partial \Delta}{\partial out_{H1}} = \frac{\partial \Delta_{O1}}{\partial out_{H1}} + \frac{\partial \Delta_{O2}}{\partial out_{H1}} \quad (13)$$

Figure 7B:
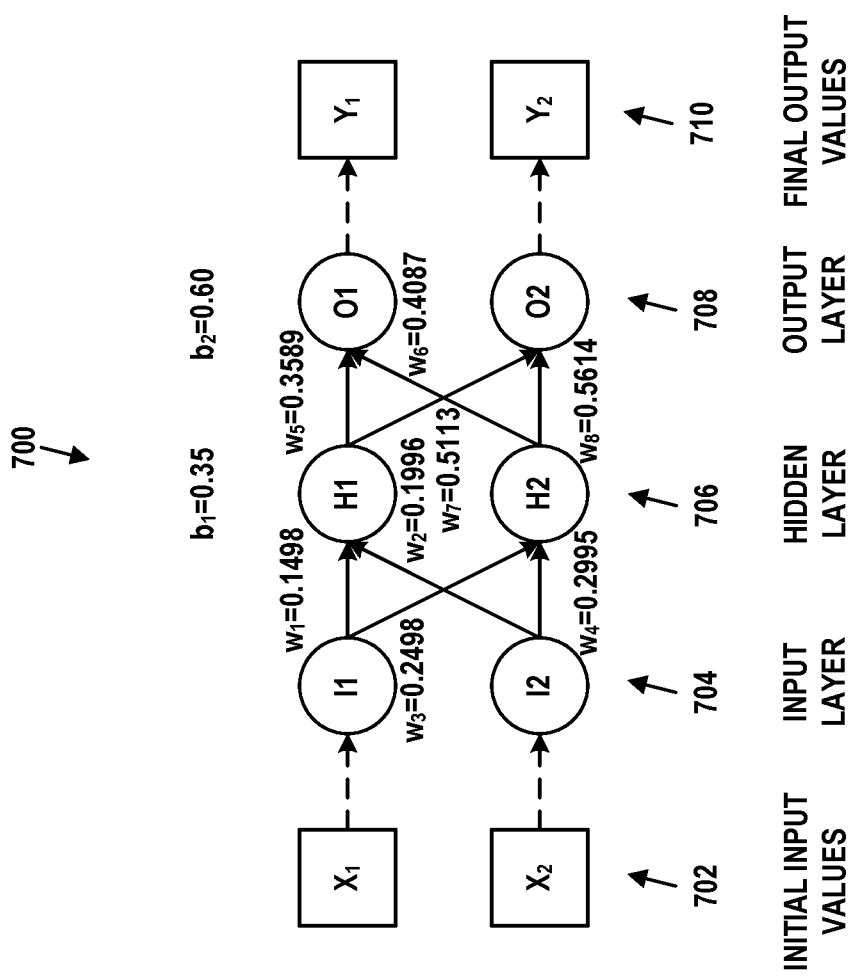
FIG. 7B depicts an ANN in the process of being trained, in accordance with example embodiments.

Similar equations can be for each of the other weights, $w_2$, $w_3$, and $w_4$ feeding into hidden layer 706. Not unlike Equation 9, each of these equations can be solved using the information above. The results are:

$w_1 = 0.14978072$ $w_2 = 0.19956143$ $w_3 = 0.24975114$ $w_4 = 0.29950229 \quad (14)$ At this point, the backpropagation iteration is over, and all weights have been updated. FIG. 7B shows ANN 700 with these updated weights, values of which are rounded to four decimal places for sake of convenience. ANN 700 may continue to be trained through subsequent feed forward and backpropagation iterations. For instance, the iteration carried out above reduces the total error, $\Delta$, from 0.298371109 to 0.291027924. While this may seem like a small improvement, over several thousand feed forward and backpropagation iterations the error can be reduced to less than 0.0001. At that point, the values of $Y_1$ and $Y_2$ will be close to the target values of 0.01 and 0.99, respectively.

In some cases, an equivalent amount of training can be accomplished with fewer iterations if the hyperparameters of the system (e.g., the biases $b_1$ and $b_2$ and the learning rate $\alpha$) are adjusted. For instance, the setting the learning rate closer to 1.0 may result in the error rate being reduced more rapidly. Additionally, the biases can be updated as part of the learning process in a similar fashion to how the weights are updated.

Regardless, ANN 700 is just a simplified example. Arbitrarily complex ANNs can be developed with the number of nodes in each of the input and output layers tuned to address specific problems or goals. Further, more than one hidden layer can be used and any number of nodes can be in each hidden layer.

VI. NATURAL LANGUAGE PROCESSING OF TEXT QUERIES

Natural language processing is a discipline that involves, among other activities, using computers to understand the structure and meaning of human language. This determined structure and meaning may be applicable to the processing of IT incidents, as described below.

Each incident may be represented as an incident record. While incident records may exist in various formats and contain various types of information, an example incident record 800 is shown in FIG. 8. Incident record 800 consists of a number of fields in the left column, at least some of which are associated with values in the right column.

Field 802 identifies the originator of the incident, in this case Bob Smith. Field 804 identifies the time at which the incident was created, in this case 9:56 AM on Feb. 7, 2018. Field 806 identifies the description of the problem, as provided by the originator. Thus, field 806 may be a free-form text string containing anywhere from a few words to several sentences or more. Field 808 is a categorization of the incident, in this case email. This categorization may be provided by the originator, the IT personnel to whom the incident is assigned, or automatically based on the context of the problem description field.

Field 810 identifies the IT personnel to whom the incident is assigned (if applicable), in this case Alice Jones. Field 812 identifies the status of the incident. The status may be one of "open," "assigned," "working," or "resolved" for instance. Field 814 identifies how the incident was resolved (if applicable). This field may be filled out by the IT personnel to whom the incident is assigned or another individual. Field 816 identifies the time at which the incident was resolved, in this case 10:10 AM on Feb. 7, 2018. Field 818 specifies the closure code of the incident (if applicable) and can take on values such as "closed (permanently)", "closed (work around)", "closed (cannot reproduce)", etc. Field 820 identifies any additional notes added to the record, such as by the IT personnel to whom the incident is assigned. Field 822 identifies a link to an online article that may help users avoid having to address a similar issue in the future.

Incident report 800 is presented for purpose of example. Other types of incident reports may be used, and these reports may contain more, fewer, and/or different fields.

Incident reports, such as incident report 800, may be created in various ways. For instance, by way of a web form, an email sent to a designated address, a voicemail box using speech-to-text conversion, and so on. These incident reports may be stored in an incident report database that can be queried. As an example, a query in the form of a text string could return one or more incident reports that contain the words in the text string.

Figure 9:
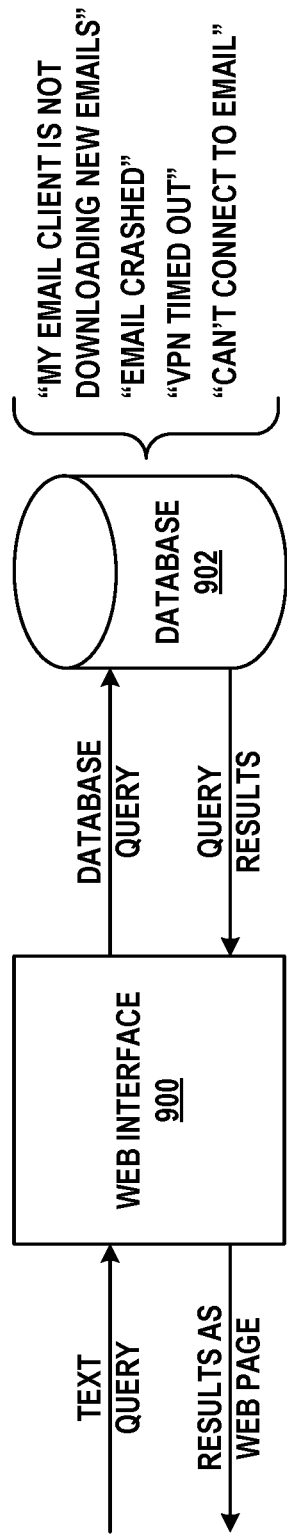
FIG. 9 depicts a database query architecture, in accordance with example embodiments.

This process is illustrated in FIG. 9. A text query may be entered into web interface 900. This web interface may be supplied by way of a computational instance of remote network management platform 320. Web interface 900 converts the text query into a database query (e.g., an SQL query), and provides the SQL query to database 902. This database may be CMDB 500 or some other database. Database 902 contains a number of incident reports with problem description fields as shown in FIG. 8. Regardless, database 902 conducts the query and returns matching results to web interface 900. One or more such results may be returned. Web interface 900 provides these results as a web page.

For example, if the text query is "email", web interface 900 may convert this query into an SQL query of database 902. For example, the query may look at the problem description field of a table containing incident reports. Any such incident report that matches the query—i.e., includes the term "email"—may be provided in the query results. Thus, the incident reports with the problem descriptions of "My email client is not downloading new emails", "Email crashed", and "Can't connect to email" may be provided, while the incident report with the problem description "VPN timed out" is not returned.

This matching technique is simplistic and has a number of drawbacks. It only considers the presence of the text of the query in the incidents. Thus, it does not consider contextual information, such as words appearing before and after the query text. Also, synonyms of the query text (e.g., "mail" or "message") and misspellings of the query text (e.g., "emial") would not return any results in this example.

Furthermore, deploying such a solution would involve use of an inefficient sparse matrix, with entries in one dimension for each word in the English language and entries in the other dimension for the problem description of each incident. While the exact number of English words is a matter of debate, there are at least 150,000-200,000, with less than about 20,000 in common use. Given that a busy IT department can have a database of tens of thousands of incidents, this matrix would be quite large and wasteful to store even if just the 20,000 most commonly used words are included.

VII. NATURAL LANGUAGE PROCESSING OF TEXT QUERIES WITH CONTEXT

The embodiments herein introduce improvements to text query matching related to incident records. These improvements include matching based on context, and an ANN model that provides compact representations of words and text strings that saves a significant amount of memory over simple word matrix based approaches. Furthermore, enhanced graphical user interfaces provide fine-grained control over the model and how it is configured and evaluated.

Figure 10A:
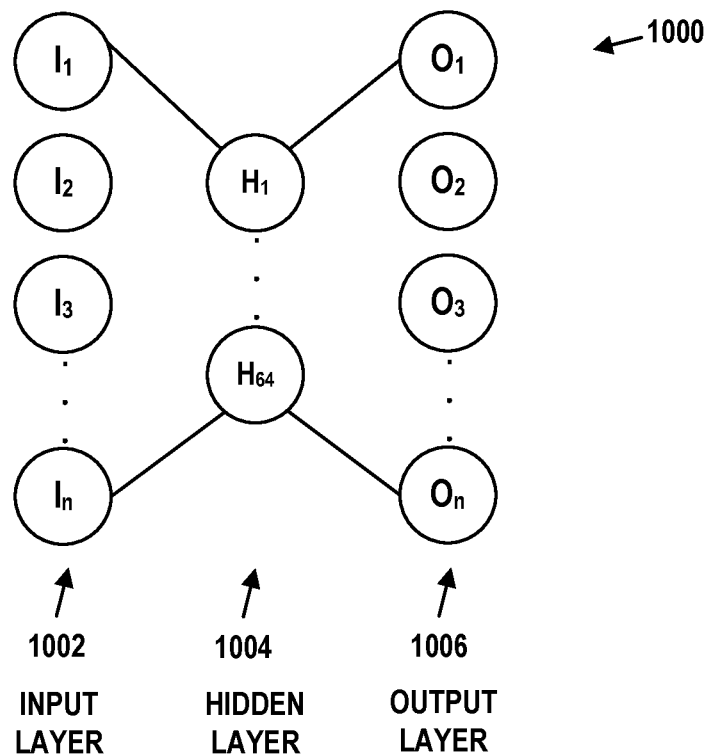
FIG. 10A depicts an ANN configured for learning the contextual meanings of words, in accordance with example embodiments.

In particular, an ANN may be trained with a large number of text strings from the database to determine the contextual relationships between words appearing in these text strings. Such an ANN 1000 is shown in FIG. 10A. ANN 1000 includes input layer 1002, which feeds into hidden layer 1004, which in turn feeds into output layer 1006. The number of nodes in input layer 1002 and output layer 1006 may be equivalent to the number of words in a pre-defined vocabulary or dictionary (e.g., 20,000, 50,000, or 100,000). The number of nodes in hidden layer 1004 may be much smaller (e.g., 64 as shown in FIG. 10A, or other values such as 16, 32, 128, 512, 1024, etc.).

Figure 10B:
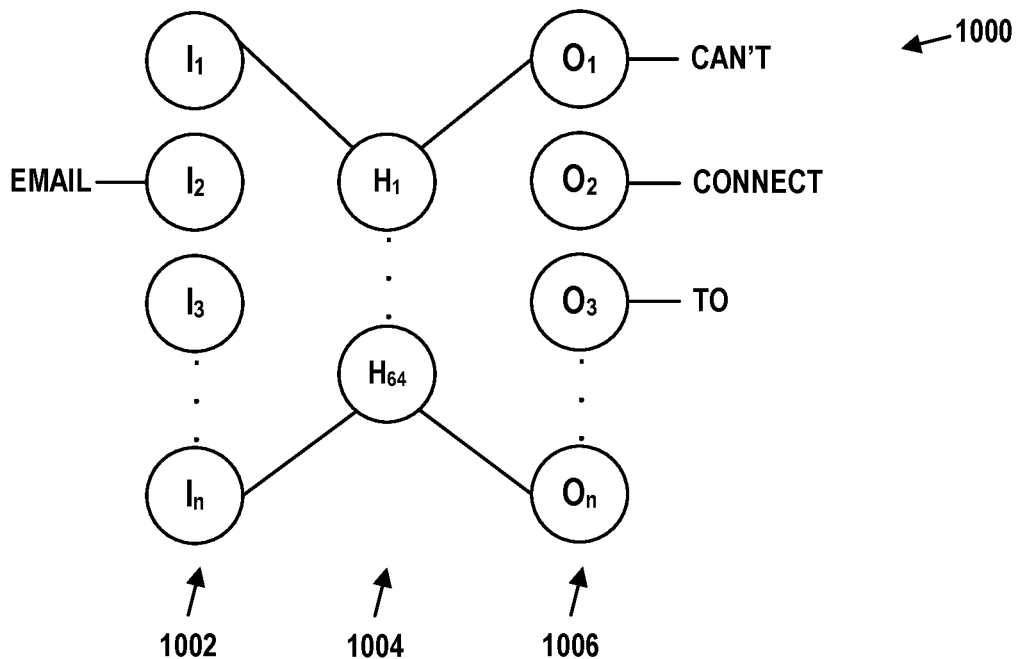
FIG. 10B depicts a set of training data for the ANN of FIG. 10A, in accordance with example embodiments.

For each text string in the database, ANN 1000 is trained with one or more arrangements of words. For instance, in FIG. 10B, ANN 1000 is shown being trained with input word "email" and output words "can't", "connect" and "to". The output words serve as the ground truth output values to which the results produced by output layer 1006 are compared. This arrangement reflects that "email" appears proximate to "can't", "connect" and "to" in a text string in database 902.

In an implementation, this could be represented as node $I_2$ receiving an input of 1, and all other nodes in input layer 1002 receiving an input of 0. Similarly, node $O_1$ has a ground truth value of "can't", node $O_2$ has a ground truth value of "connect", and node $O_3$ has a ground truth value of "to". In the implementation, this could be represented as nodes $O_1$, $O_2$, and $O_3$ being associated with ground truth values of 1 and all other nodes in output layer 1006 having ground truth values of 0. The loss function may be a sum of squared errors, for example, between the output of output layer 1006 and a vector containing the ground truth values.

Figure 10C:
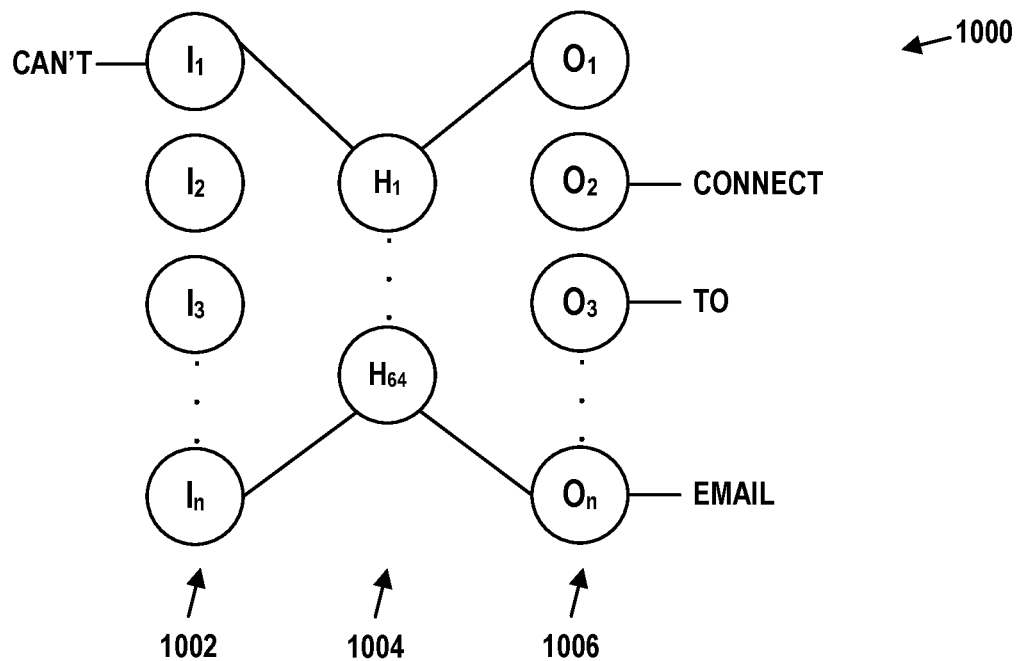
FIG. 10C depicts a set of training data for the ANN of FIG. 10A, in accordance with example embodiments.
Figure 10D:
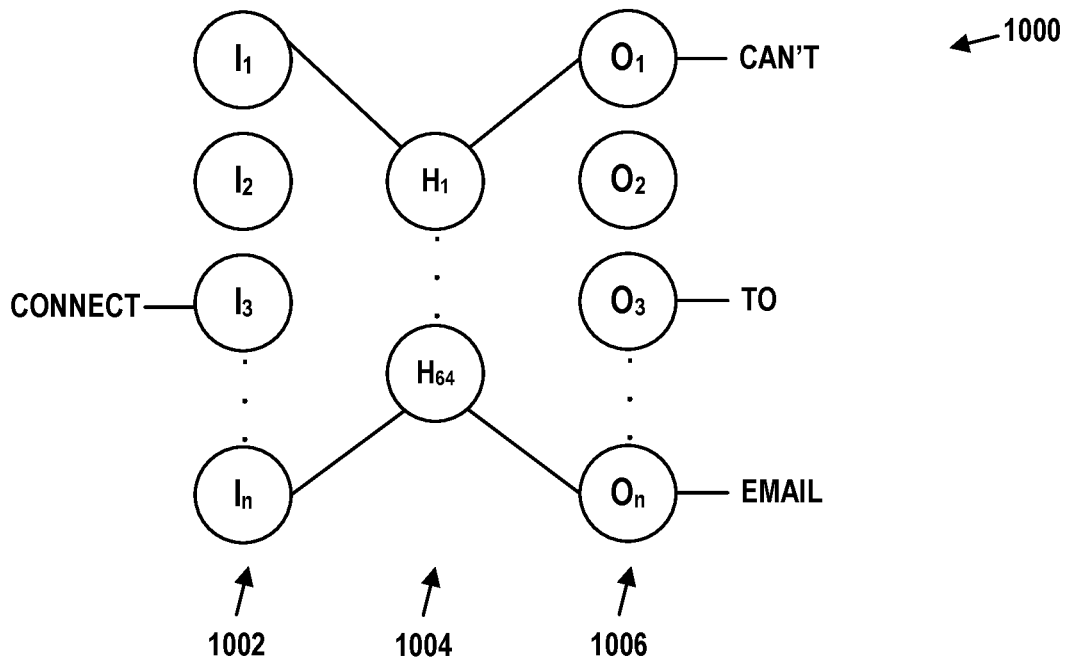
FIG. 10D depicts a set of training data for the ANN of FIG. 10A, in accordance with example embodiments.

Other arrangements of this text string from database 902 may be used to train ANN 1000. For instance, as shown in FIG. 10C, the input word may be "can't" and the output words may be "connect", "to", and "email." In another example, as shown in FIG. 10D, the input word may be "connect" and the output words may be "can't", "to", and "email."

In general, these arrangements may be selected so that the output words are within w words of the input word (e.g., where w could be 1, 2, 3, 5, etc.), the output words are in the same sentence as the input word, the output words are in the same paragraph as the input word, and so on. Furthermore, various word arrangements of each text string in database 902 may be used to train ANN 1000. These text strings may be selected from problem description field 806, category field 808, resolution field 814, notes field 820, and/or any other field or combination of fields in an incident record.

After ANN 1000 is trained with these arrangements of text strings, hidden layer 1004 becomes a compact vector representation of the context and meaning of an input word. For example, assuming that ANN 1000 is fully-trained with a corpus of 10,000 or so text strings (though more or fewer text strings may be used), an input word of "email" may have a similar vector representation of an input word of "mail". Intuitively, since hidden layer 1004 is all that ANN 1000 has to determine the context of an input word, if two words have similar contexts, then they are highly likely to have similar vector representations.

Furthermore, vectors generated in this fashion are additive. Thus, subtracting the vector representation of "mail" from the vector representation of "email" is expected to produce a vector with values close to 0. However, subtracting the vector representation of "VPN" from the vector representation of "email" is expected to produce a vector with higher values. In this manner, the model indicates that "email" and "mail" have closer meanings than "email" and "VPN".

Vector representations of words can be determined in other ways. For instance, a so-called paragraph vector may be formed for a text string by performing operations (e.g., addition) on a series of vectors found by training an ANN using sample from a sliding window passed over the text string. Such a paragraph vector represents the context and meaning of the entire paragraph, and can be combined with word vectors to provide further context to these word vectors. In alternative embodiments, a word co-occurrence matrix can be decomposed (e.g., using gradient descent) into two much smaller matrices, each containing vector representations of words. Other possibilities exist.

Once vector representations have been determined for all words of interest, linear and/or multiplicative aggregations of these vectors may be used to represent text strings. For instance, a vector for the text string "can't connect to email" can be found by adding together the individual vectors for the words "can't", "connect", "to", and "email". In some cases, an average or some other operation may be applied to the vectors for the words. This can be expressed below as the vector sum of m vectors $v_i$ with each entry therein divided by m, where i={1 . . . m}. But other possibilities, such as weighted averages, exist.

$$v_{avg} = \frac{1}{m}\sum_{i=1}^{m} v_i \quad (15)$$

Regardless of how the aggregations are determined, this general technique allows vector representations for each text string in database 902 to be found. These vector representations may be stored in database 902 as well, either along with their associated text strings or separately.

Figure 11A:
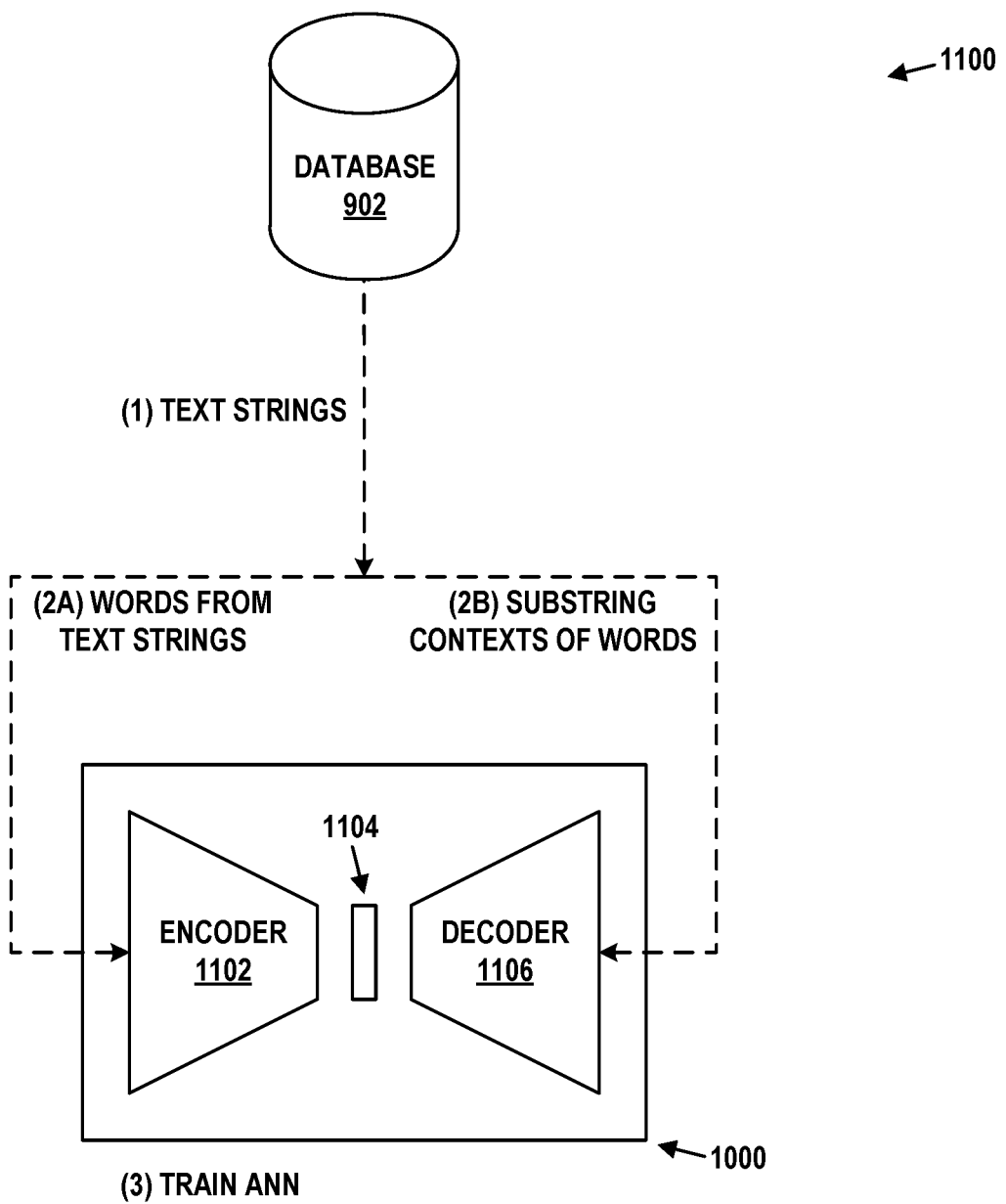
FIG. 11A depicts training an ANN, in accordance with example embodiments.
Figure 11B:
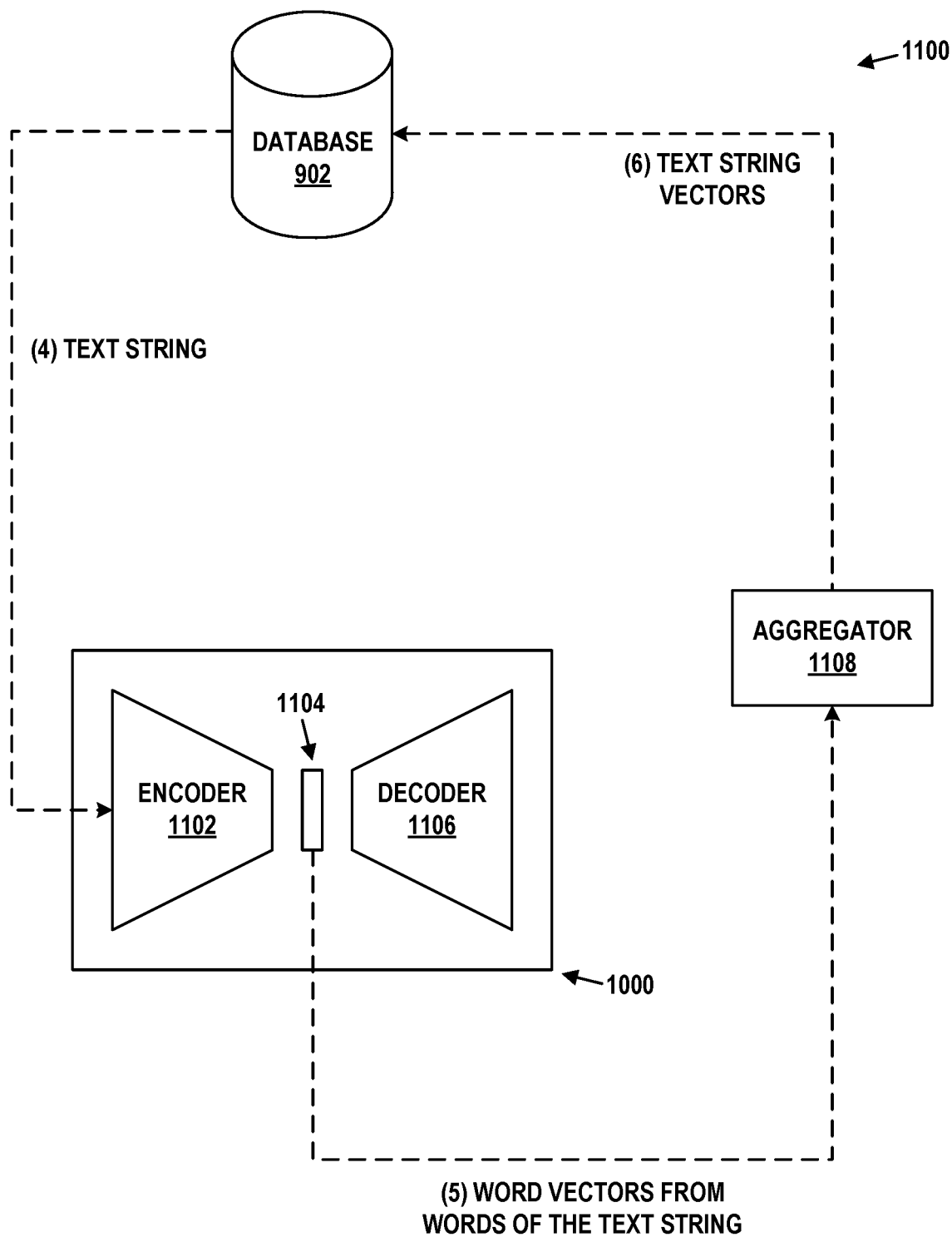
FIG. 11B depicts deriving text string vectors using at least part of a trained ANN, in accordance with example embodiments.
Figure 11C:
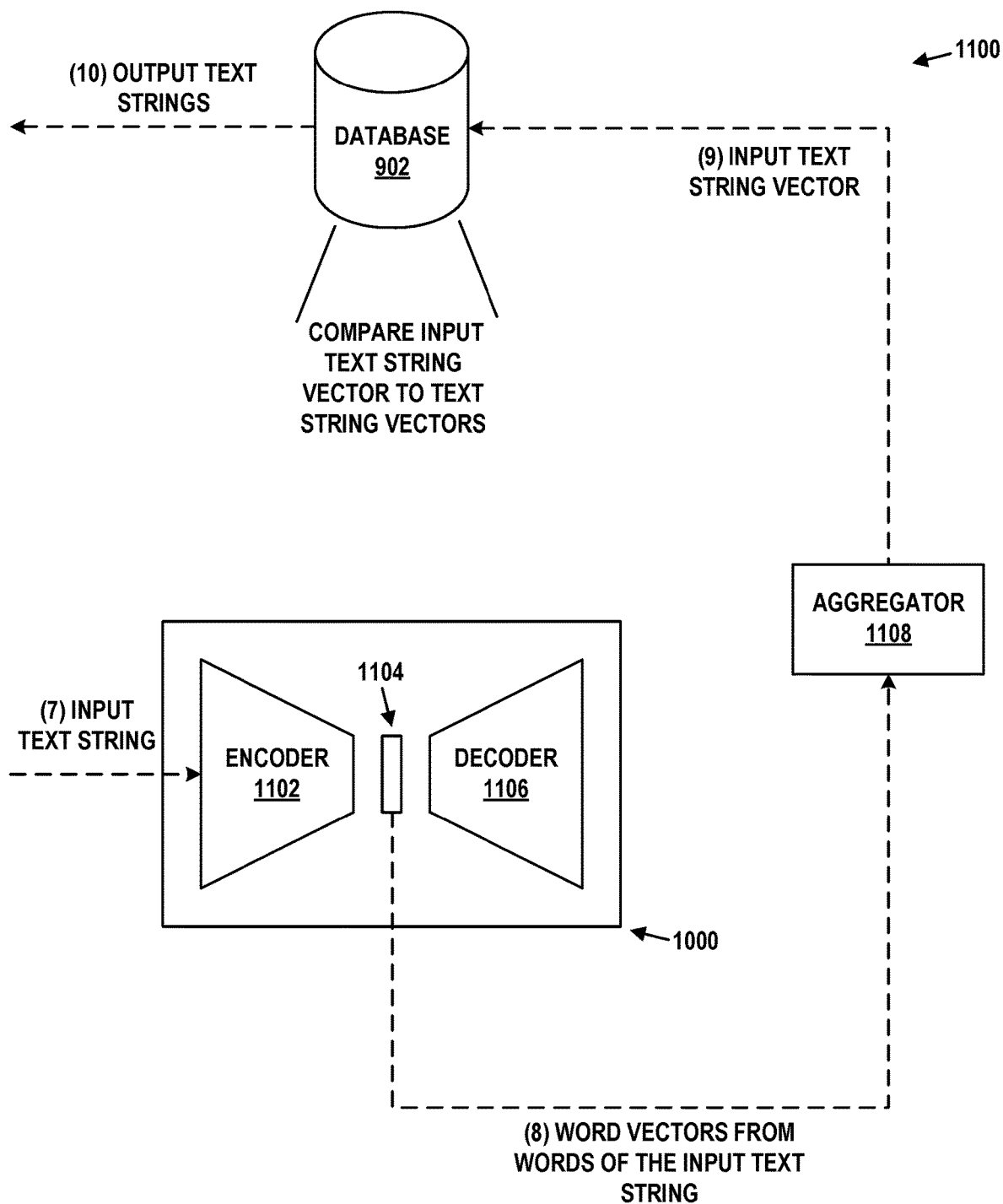
FIG. 11C depicts looking up contextually similar text strings using at least part of a trained ANN, in accordance with example embodiments.

This process is illustrated in FIGS. 11A, 11B, and 11C. FIG. 11A depicts an arrangement 1100 including database 902 and ANN 1000. ANN 1000 is broken up into encoder 1102, vector 1104, and decoder 1106. Encoder 1102 includes input layer 1002 and associated weights, vector 1104 includes hidden layer 1004, and decoder 1106 inputs output layer 1006 and associated weights.

At step 1, text strings are obtained from database 902. As noted above, these text strings may be from parts of incident reports. At step 2A, words are extracted from the text strings. The words extracted may be all of the words in the text strings or some of these words. These extracted words are provided as input to ANN 1000. At step 2B, the sub string contexts of these words are extracted from the text strings. The substring contexts may be one or more substrings containing words before, after, or surrounding the associated words extracted at step 2B. As an example, the words and associated substring contexts for the text string of "can't connect to email" are shown in Table 2.

TABLE 2

| Word | Substring Context |
|------|-------------------|
| can't | connect to email |
| connect | can't to email |
| to | can't connect email |
| email | can't connect to |

Thus, for this text string, the four associations of Table 2 are made. In some examples with longer text strings, only words are within w words of the word used as input may be represented in these substrings.

At step 3, ANN 1000 is trained with such associations for a corpus of text strings in database 902. This results in encoder 1102 being capable of producing a vector representation of an input word, where the vector representation encodes a contextual meaning of the word.

Turning to FIG. 11B, the next stage of the process is shown. At step 4, a text string is selected from database 902. Each word of this text string is individually provided to encoder 1102. The corresponding outputs are vector representations of each word (word vectors). At step 5, these word vectors are provided to aggregator 1108. Aggregator 1108 aggregates the word vectors into a text string vector. As noted above, this aggregation may be based on a vector sum or some other operation(s). At step 6, this text string vector is stored in database 902. The storage associates the text string vector with the text string from which it was derived (e.g., in a one to one association).

The process illustrated in FIG. 11B may be repeated for each text string from the corpus of text strings in database 902. Consequently, database 902 ultimately contains an association between each of these text strings and a corresponding text string vector.

Turning to FIG. 11C, the lookup process is shown. At step 7, an input text string is received and provided, word-by-word, to encoder 1102. The input text string may have been typed into a web interface by a user and may be, for example, a problem description of an incident.

At step 8, word vectors from words of the input text string are obtained from vector 1104. These word vectors are provided to aggregator 1108. As noted above, aggregator 1108 aggregates the word vectors into an input text string vector. At step 9, the input text string vector is provided to database 902, or at least to a computing device with access to database 902.

Then, database 902 or this computing device determines matching text string vectors in database 902 according to specific criteria. In this process, cosine similarity (or any other similarity metric) between the input text string and each of the text strings in database 902 may be calculated. As an example, for two vectors u and v each with m entries, cosine similarity may be:

$$s = \frac{\sum_{j=1}^{m} u[j]v[j]}{\sqrt{\sum_{j=1}^{m} u[j]^2} \sqrt{\sum_{j=1}^{m} v[j]^2}} \quad (16)$$

Thus, the higher the value of s, the more similar the two vectors. In some cases, the difference between the vectors may be expressed as a number between 0 and 1 inclusive (i.e., in the range of 0% to 100%).

The comparison may identify one or more text string vectors from database 902 that "match" in this fashion. In some cases this may be the k text string vectors with the highest similarity, or any text string vector with a similarity that is greater than a pre-determined value. At step 10, for each of the identified text string vectors, the associated text string may be looked up in database 902 and provided as an output text string. In some cases, the associated incident reports may be provided as well.

In some cases, only incident reports that are not older than a pre-determined age are provided. For instance, the system may be configured to identify text string vectors only from incident reports that were resolved within the last 3 months, 6 months, or 12 months. Alternatively, the system may be configured to identify text string vectors only from incident reports that were opened within the last 3 months, 6 months, or 12 months.

In this fashion, incident reports with similar problem descriptions as that of the input text string can be rapidly identified. Notably, this system provides contextual results that are more likely to be relevant and meaningful to the input text string. Consequently, an individual can review these incident reports to determine how similar problems as that in the problem description have been reported and addressed in the past. This may result in the amount of time it takes to resolve incidents being dramatically reduced.

VIII. EXAMPLE GRAPHICAL USER INTERFACES

Figure 12A:
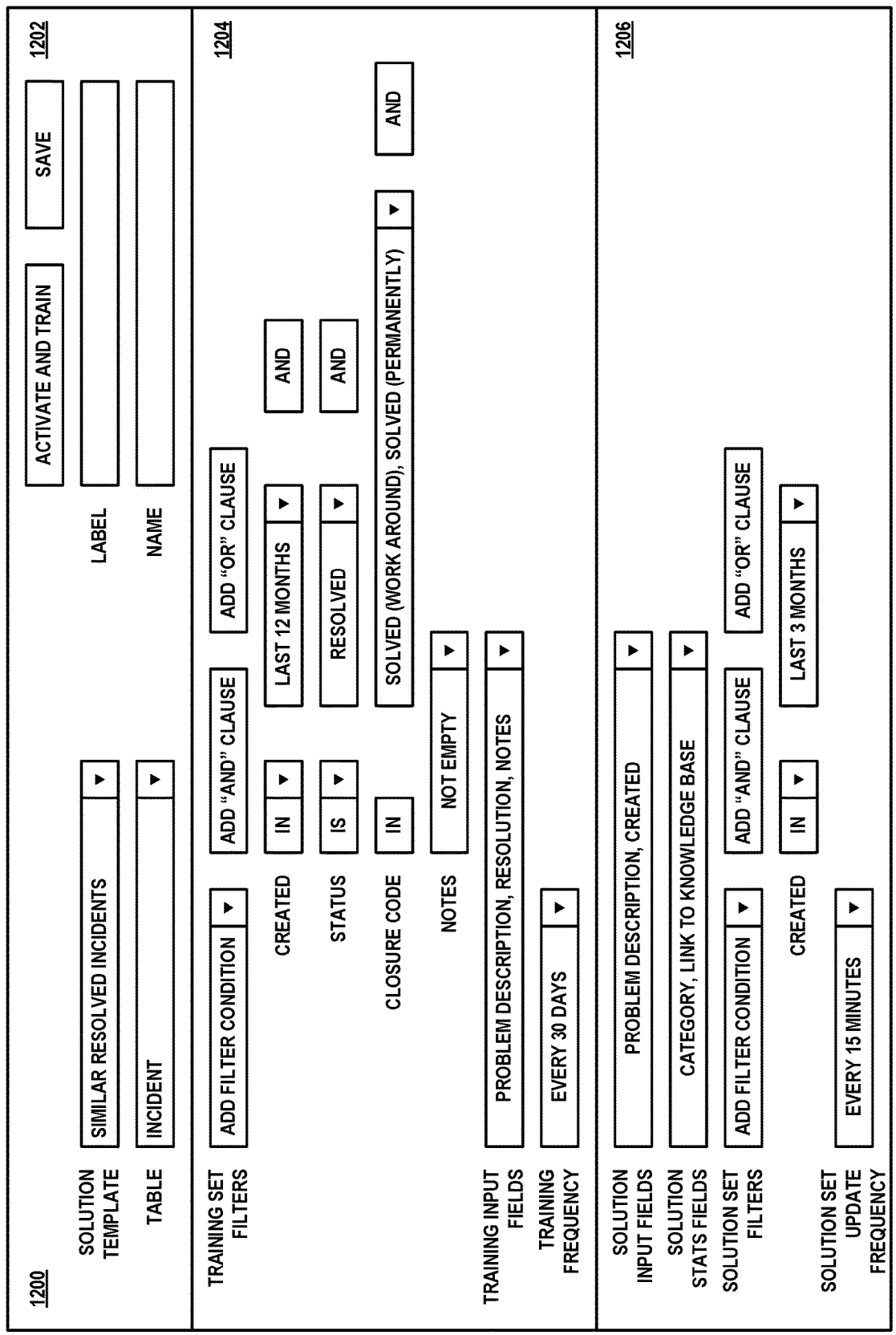
FIG. 12A depicts a graphical user interface, in accordance with example embodiments.
Figure 12C:
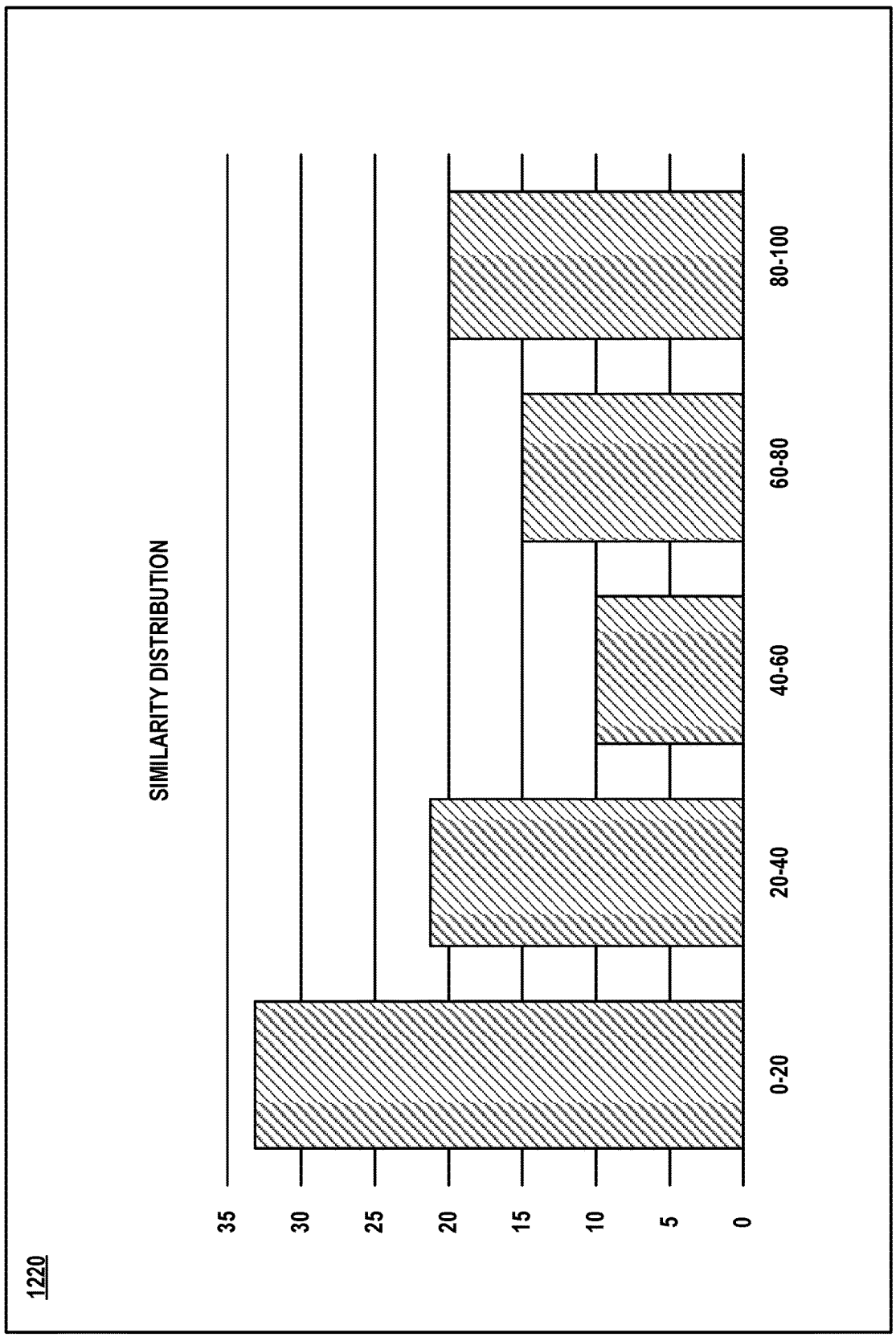
FIG. 12C depicts a graphical user interface, in accordance with example embodiments.

FIGS. 12A, 12B, and 12C are example graphical user interfaces that may be presented to users for the configuration and management of vector-based text string matching as described herein. These graphical user interfaces may be defined on a remote network management platform and presented to client devices for display. Advantageously, the graphical user interfaces allow an individual to rapidly define how the text string matching is to be carried out, as well as to evaluate the efficacy thereof.

FIG. 12A depicts graphical user interface 1200, which includes three sections: definition section 1202, training section 1204, and solution section 1206. Definition section 1202 includes a drop down menu for selecting a solution template. Solution templates may define what components appear in definition section 1202, training section 1204, and solution section 1206, as well as any default values of these components. Definition section 1202 also includes a drop down menu for selecting a table from a database in which text string matching will occur. This menu is shown with the "incident" table selected, indicating that incident records (such as the incident record of FIG. 8) are to be searched.

Definition section 1202 also includes text boxes for the user to specify a label and a name for the solution. Definition section 1202 further includes a button to activate and train the solution (e.g., using the training data defined in training section 1204) and a button to save the solution.

Training section 1204 specifies parameters for training the ANN. This section includes training set filters that allow the user to specify a Boolean expression that is to be used to search fields of the specified table. For instance, by activating the button to add an "and" clause or the button to add an "or" clause, the user may be prompted to select one of more fields of the table for inclusion in the Boolean expression. In the expression displayed, the filter specifies that training will be limited to incidents created in the last 12 months, for which the status is resolved, for which the closure code is either that the incident was solved permanently or with a work around, and for which the notes field is not empty. Fields can be removed from the Boolean expression by changing the selector that currently displays "add filter condition" to another value not shown, such as "remove filter condition."

The training input fields selector specifies the fields of the table from which text strings are to be obtained. In this case, the problem description, resolution, and notes fields are to be used. Notably, this allows an ANN to be trained using text strings from multiple fields, even if input text strings in queries are only coming from one of these fields (e.g., problem description). Thus, the system's vocabulary is likely to be richer than just the words appearing in each individual field. The training frequency selector specifies how often the ANN is to be trained according to the specified parameters.

Solution section 1206 specifies how input text strings are derived and used from a new incident. The solution input fields selector specifies the fields of the table that are to be relevant for input text strings. As shown, input text strings are taken from the problem description field. Also, the created field is relevant because it may be desirable to prefer to display matches that occurred closer in time to the time at which the new incident was created. The created field may also be used as a segmentation cutoff of the training data for cross-validation—i.e., in 80/20 cross-validation, the 20% of incidents being validated may have a created field more recent than a cutoff date, and the 80% of incidents used to generate the ANN may have a created field older than the cutoff date.

The solution stats fields selector specifies the fields of the table that are expected be similar between incidents in which text strings were found to be similar. In other words, when the problem description field of a new incident is determined to best match the problem description, resolution, and notes fields of an old incident, it is also expected that the category field of both incidents will match. When this happens, the user has even more confidence that the matched incident is relevant.

The solution set filters allow the user to specify a Boolean expression that is to be used to filter the results. These filters may be specified in a similar fashion as the training set filters. The filter shown provides only incidents that were created in the last three months as results.

The solution set update frequency drop down menu specifies an amount of time before newly closed incidents are added to the model. As shown, this frequency is set to 15 minutes. Thus, every 15 minutes, the system may generate new text string vectors for text from various fields of incidents that were closed in the last 15 minutes, and store these text string vectors in the database. Doing so is helpful in situations where multiple similar problems are being experienced by multiple users within a relatively short period of time (perhaps due to a common root cause). In this way, the users handling the new incidents can quickly become aware that their incidents are not isolated, and a coordinated response to these incidents can be employed.

FIG. 12B depicts graphical user interface 1210, which includes a table with columns and rows. The top row provides a column header, and the bottom three rows provide values. In some embodiments, the rows with values may be sortable by column. For instance, FIG. 12B shows these rows sorted by the second leftmost column in increasing order from "low" to "medium" to "high". The other columns may be similarly sortable.

This table provides the user with the ability to rapidly determine how often matching incidents identified by the system (i.e., based on text string matches in accordance with the embodiments herein) also have matching fields that were specified in the solution stats fields of graphical user interface 1200. Thus, the table of graphical user interface 1210 includes entries for the category and link to knowledge base fields.

As noted above, the system may generate a numerical representation of how well the problem description of a new incident matches the text of incidents in the database. This numerical representation may be a percentage in the range of 0% to 100%. The higher the percentage, the better the match. For example, incidents with a match value 90% are much more similar than incidents with a match value of 50%.

Continuing with the example of comparing a new incident compared to incidents in the database, for all of the latter that were compared to the new incident, the match values thereof are placed into buckets with the ranges shown. Thus, each compared incident from the database is placed into exactly one of the buckets 80%-100%, 60%-80%, 40%-60%, 20%-40%, or 0%-20% based on the match score.

The user may expect that where there is a high match score (e.g., falling in the range of 80%-100% or 60%-80%), a match between the category and link to knowledge base fields is also likely. In other words, if the problem description of a new incident matches the text of an incident in the database with a match value of 90%, it is expected that the category field of the new incident will match the category field of the incident from the database most of the time and that the link to knowledge base field of the new incident will match the link to knowledge base field of the incident from the database most of the time.

The values in the rows for the category and link to knowledge base fields display this information. For instance, for match values in the 80%-100% range, there is a high likelihood that the category fields will match, and a medium likelihood that the link to knowledge base fields will match. The cutoff thresholds between "low" and "medium" and between "medium" and "high" may be calculated in the following fashion. Other techniques, however, could also be used.

For all similarity statistics (except possibly for text match), the number of match values in each enumerated range (80%-100%, 60%-80%, 40%-60%, 20%-40%, and 0%-20%) is considered. A mean and a standard deviation of these values are calculated across all similarity statistics. Then, for each similarity statistic, any enumerated range with a number of match values within one standard deviation of the mean is labeled as "medium". Likewise, any enumerated range with a number of match values more than one standard deviation above the mean is labeled as "high". Furthermore, any enumerated range with a number of match values less than one standard deviation below the mean is labeled as "low".

The text match row displays a similar evaluation for the raw words that are common to the new incident (e.g., from the problem description field of the new incident and one or more fields of an incident from the database). The more words that overlap between these incidents, the better the match. Thus, in graphical user interface 1210, for match values in the 80%-100% range, there is a high text match between the incidents. Other techniques, however, could also be used.

For text match statistics, the number of match values in each enumerated range (80%-100%, 60%-80%, 40%-60%, 20%-40%, and 0%-20%) is considered. A mean and a standard deviation of these values are calculated. Then, any enumerated range for text match statistics with a number of match values within one standard deviation of the mean is labeled as "medium". Likewise, any enumerated range with a number of match values more than one standard deviation above the mean is labeled as "high". Furthermore, any enumerated range with a number of match values less than one standard deviation below the mean is labeled as "low".

The data shown in FIG. 12B may be generated during cross-validation of the ANN (e.g., an 80/20 cross-validation, in which 80% of the data is used to train the system and the remaining 20% is used to test the system as trained). Thus, this information may be helpful to users when identifying fields in incident records on which to filter results. In some embodiments, from the 20% validation data, some query incidents are randomly sampled and displayed with their matching incidents over the range of similarity scores. This is to show some representative examples of expected output from the model. These embodiments reflect a significant improvement over previous ways of identifying such fields, as in the past users had to employ their subjective experience and guesswork. The embodiments herein provide objective data to support identification of such fields.

FIG. 12C depicts graphical user interface 1220, which includes a bar chart. This chart represents the distribution of match values for a new incident over a set of the incidents in the database determined to be matches for the new incident. For instance, 33% of the matching incidents have a match value between 0% and 20%, 22% have a match value between 20% and 40%, 10% have a match value between 40% and 60%, 15% have a match value between 60% and 80%, and 20% have a match value between 80% and 100%. Note that some match values of incidents deemed to be "matches" may be low when the system is configured to provide a certain number of match (e.g., the top 20 matches).

Graphical user interface 1220 provides the user with a visual representation of overall match quality and accuracy. The user may also use this information to set a cutoff match value to further filter out matching incidents (i.e., incidents with match values below the cutoff are not provided).

Based on the bar chart, the user can determine, for any cutoff of match value, the tradeoff of confidence (e.g., the match value is above the cutoff) versus coverage (the percentage of total query incidents to be considered). For instance, if there are 100 query incidents represented in the bar chart, the user can rapidly conclude that if a cutoff of 60% is used, provided query will have a confidence of 60% or higher, but coverage is reduced to 35%.

Graphical user interface 1220 provides an improvement over past techniques where the user had to employ guesswork or trial and error to determine the pros and cons of such a filtering cutoff.

IX. EXAMPLE OPERATIONS

Figure 13:
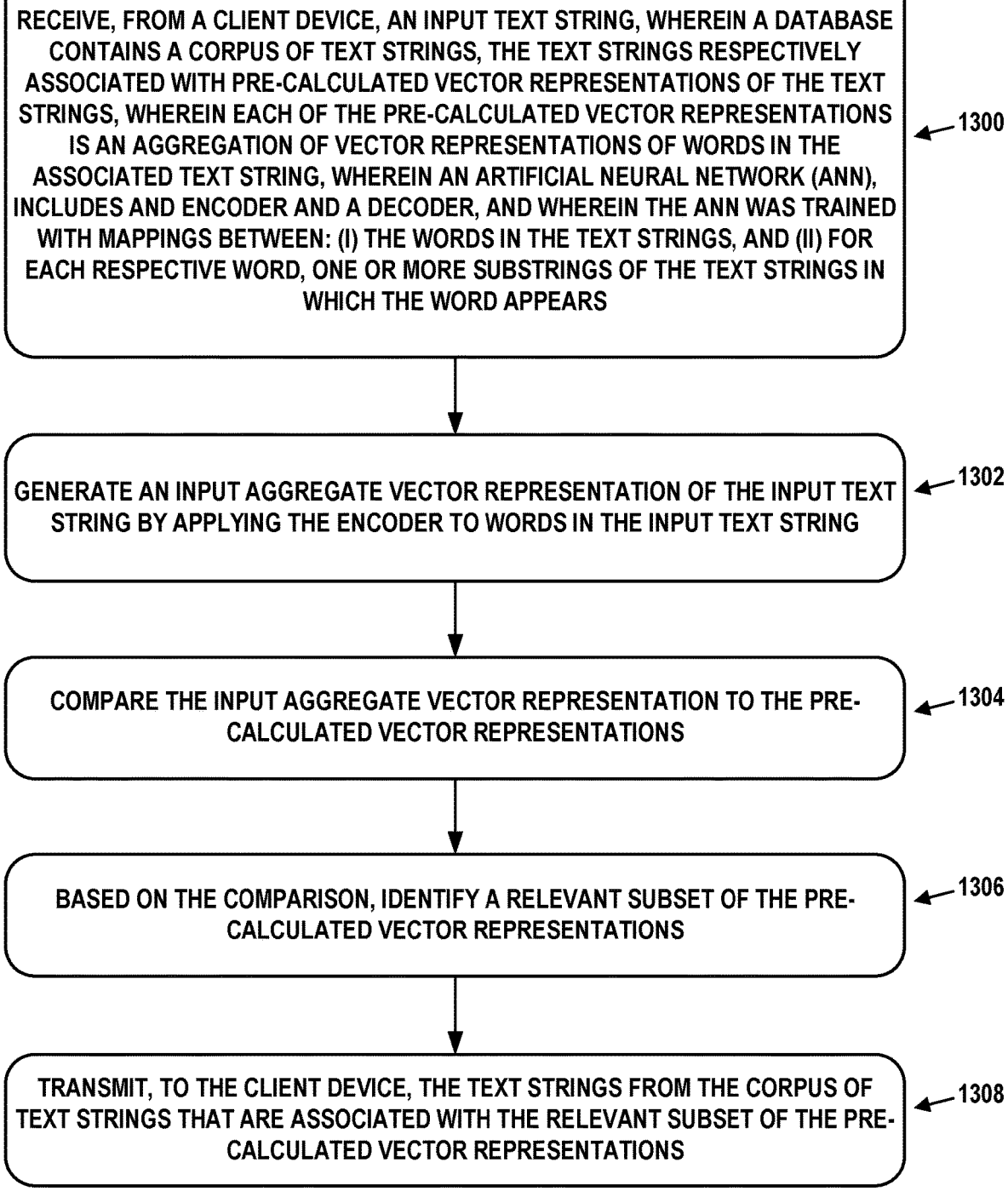
FIG. 13 is a flow chart, in accordance with example embodiments.

FIG. 13 is a flow chart illustrating an example embodiment. The process illustrated by FIG. 13 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 13 may be simplified by the removal of any one or more of the features shown therein. Further, these embodiments may be combined with features, aspects, and/or implementations of any of the previous figures or otherwise described herein.

Block 1300 may involve receiving, from a client device, an input text string, where a database contains a corpus of text strings, the text strings respectively associated with pre-calculated vector representations of the text strings, where each of the pre-calculated vector representations is an aggregation of vector representations of words in the associated text string, where an ANN includes an encoder and a decoder, and where the ANN was trained with mappings between: (i) the words in the text strings, and (ii) for each respective word, one or more substrings of the text strings in which the word appears.

Block 1302 may involve generating an input aggregate vector representation of the input text string by applying the encoder to words in the input text string.

Block 1304 may involve comparing the input aggregate vector representation to the pre-calculated vector representations.

Block 1306 may involve, possibly based on the comparison, identifying a relevant subset of the pre-calculated vector representations.

Block 1308 may involve transmitting, to the client device, the text strings from the corpus of text strings that are associated with the relevant subset of the pre-calculated vector representations.

In some embodiments, comparing the input aggregate vector representation to the pre-calculated vector representations may involve calculating respective cosine similarities between the input aggregate vector representation and each of the pre-calculated vector representations. Identifying the relevant subset of the pre-calculated vector representations may involve identifying, as the relevant subset, pre-calculated vector representations associated with a set of cosine similarities that are greater than a pre-determined value. Alternatively or additionally, identifying the relevant subset of the pre-calculated vector representations may involve identifying, as the subset, pre-calculated vector representations with a set of k highest cosine similarities, wherein k is at least 2.

In some embodiments, the vector representations of the respective words have at least 16 entries.

In some embodiments, the decoder maps the vector representations of the respective words of a particular text string to the one or more substrings of the particular text string.

In some embodiments, a substring of a particular text string consists of two or more words in the particular text string. Alternatively, a substring of a particular text string may consist of all words in the particular text string.

In some embodiments, an input layer of the ANN contains one node for each word in a pre-established dictionary of words, where a hidden layer of the ANN contains one node for each entry in the vector representations of the respective words, and where an output layer of the ANN contains one node for each word in the pre-established dictionary.

In some embodiments, the pre-calculated vector representations of the text strings are respective summations of the vector representations of words in the associated text strings.

In some embodiments, the text strings are from incident reports relating to operation of a managed network. In these embodiments, identifying the relevant subset of the pre-calculated vector representations may involve identifying, as the relevant subset, pre-calculated vector representations associated with incident reports that are not older than a pre-determined age.

Some embodiments may further involve transmitting, to the client device, a representation of a graphical user interface through which the client device can specify one or more of: one or more tables in the database that contain the text strings, first filter parameters to apply to the text strings, second filter parameters to apply to the text strings associated with the relevant subset, or a training frequency of the ANN.

X. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   a database containing a corpus of text strings, the text strings respectively associated with pre-calculated vector representations of the text strings, wherein each of the pre-calculated vector representations is an aggregation of vector representations of words in the associated text string;
   an artificial neural network (ANN) including an encoder and a decoder, wherein the ANN has been trained with mappings between: (i) the words in the text strings, and (ii) for each respective word, one or more substrings of the text strings in which the word appears, wherein the encoder generates, from the respective words, vector representations of the respective words; and a server device configured to:
  receive, from a client device, an input text string,
  generate an input aggregate vector representation of the input text string by applying the encoder to words in the input text string,
  compare the input aggregate vector representation to the pre-calculated vector representations,
  based on the comparison, identify a relevant subset of the pre-calculated vector representations, and
  transmit, to the client device, the text strings from the corpus of text strings that are associated with the relevant subset of the pre-calculated vector representations.

2. The system of claim 1, wherein comparing the input aggregate vector representation to the pre-calculated vector representations comprises:
  calculating respective cosine similarities between the input aggregate vector representation and each of the pre-calculated vector representations.

3. The system of claim 2, wherein identifying the relevant subset of the pre-calculated vector representations comprises:
  identifying, as the relevant subset, pre-calculated vector representations associated with a set of cosine similarities that are greater than a pre-determined value.

4. The system of claim 2, wherein identifying the relevant subset of the pre-calculated vector representations comprises:
  identifying, as the subset, pre-calculated vector representations with a set of k highest cosine similarities, wherein k is at least 2.

5. The system of claim 1, wherein the vector representations of the respective words have at least 16 entries.

6. The system of claim 1, wherein the decoder maps the vector representations of the respective words of a particular text string to the one or more substrings of the particular text string.

7. The system of claim 1, wherein a substring of a particular text string consists of two or more words in the particular text string.

8. The system of claim 1, wherein a substring of a particular text string consists of all words in the particular text string.

9. The system of claim 1, wherein an input layer of the ANN contains one node for each word in a pre-established dictionary of words, wherein a hidden layer of the ANN contains one node for each entry in the vector representations of the respective words, and wherein an output layer of the ANN contains one node for each word in the pre-established dictionary.

10. The system of claim 1, wherein the pre-calculated vector representations of the text strings are respective summations of the vector representations of words in the associated text strings.

11. The system of claim 1, wherein the text strings are from incident reports relating to operation of a managed network.

12. The system of claim 11, wherein identifying the relevant subset of the pre-calculated vector representations comprises:
  identifying, as the relevant subset, pre-calculated vector representations associated with incident reports that are not older than a pre-determined age.

13. The system of claim 1, wherein the server device is further configured to:
  transmit, to the client device, a representation of a graphical user interface through which the client device can specify one or more of: one or more tables in the database that contain the text strings, first filter parameters to apply to the text strings, second filter parameters to apply to the text strings associated with the relevant subset, or a training frequency of the ANN.

14. A method comprising:
  receiving, by a server device and from a client device, an input text string, wherein a database contains a corpus of text strings, the text strings respectively associated with pre-calculated vector representations of the text strings, wherein each of the pre-calculated vector representations is an aggregation of vector representations of words in the associated text string, wherein the server device also has access to an encoder of an artificial neural network (ANN), wherein the ANN also includes a decoder, and wherein the ANN was trained with mappings between: (i) the words in the text strings, and (ii) for each respective word, one or more substrings of the text strings in which the word appears;
  generating, by the server device, an input aggregate vector representation of the input text string by applying the encoder to words in the input text string;
  comparing, by the server device, the input aggregate vector representation to the pre-calculated vector representations;
  based on the comparison, identifying, by the server device, a relevant subset of the pre-calculated vector representations; and
  transmitting, by the server device and to the client device, the text strings from the corpus of text strings that are associated with the relevant subset of the pre-calculated vector representations.

15. The method of claim 14, wherein comparing the input aggregate vector representation to the pre-calculated vector representations comprises:
  calculating respective cosine similarities between the input aggregate vector representation and each of the pre-calculated vector representations.

16. The method of claim 15, wherein identifying the relevant subset of the pre-calculated vector representations comprises:
  identifying, as the relevant subset, pre-calculated vector representations associated with a set of cosine similarities that are greater than a pre-determined value.

17. The method of claim 15, wherein identifying the relevant subset of the pre-calculated vector representations comprises:
  identifying, as the subset, pre-calculated vector representations with a set of k highest cosine similarities, wherein k is at least 2.

18. The method of claim 14, wherein the text strings are from incident reports relating to operation of a managed network.

19. The method of claim 18, wherein identifying the relevant subset of the pre-calculated vector representations comprises:
  identifying, as the relevant subset, pre-calculated vector representations associated with incident reports that are not older than a pre-determined age.

20. An article of manufacture including a non-transitory computer-readable medium, having stored thereon program instructions that, upon execution by a computing system, cause the computing system to perform operations comprising:
  receiving, from a client device, an input text string, wherein a database contains a corpus of text strings, the text strings respectively associated with pre-calculated vector representations of the text strings, wherein each of the pre-calculated vector representations is an aggregation of vector representations of words in the associated text string, wherein the computing system also has access to an encoder of an artificial neural network (ANN), wherein the ANN also includes a decoder, and wherein the ANN was trained with mappings between: (i) the words in the text strings, and (ii) for each respective word, one or more sub strings of the text strings in which the word appears;

generating an input aggregate vector representation of the input text string by applying the encoder to words in the input text string;

comparing the input aggregate vector representation to the pre-calculated vector representations;

based on the comparison, identifying a relevant subset of the pre-calculated vector representations; and transmitting, to the client device, the text strings from the corpus of text strings that are associated with the relevant subset of the pre-calculated vector representations.

* * * * *